US010855934B2

(12) United States Patent
Hayashi et al.

(10) Patent No.: US 10,855,934 B2
(45) Date of Patent: Dec. 1, 2020

(54) GENERATING BIRD'S-EYE VIEW IMAGES

(71) Applicant: JVC KENWOOD Corporation, Yokohama (JP)

(72) Inventors: Naoto Hayashi, Yokohama (JP); Katsuhiko Kubo, Yokohama (JP)

(73) Assignee: JVC KENWOOD Corporation, Yokohama (JP)

( * ) Notice: Subject to any disclaimer, the term of this patent is extended or adjusted under 35 U.S.C. 154(b) by 0 days.

(21) Appl. No.: 16/357,473

(22) Filed: Mar. 19, 2019

(65) Prior Publication Data

US 2019/0215465 A1 Jul. 11, 2019

Related U.S. Application Data

(63) Continuation of application No. PCT/JP2017/039953, filed on Nov. 6, 2017.

(30) Foreign Application Priority Data

Feb. 28, 2017 (JP) .................. 2017-036656
Feb. 28, 2017 (JP) .................. 2017-036657

(51) Int. Cl.
*H04N 7/18* (2006.01)
*H04N 5/262* (2006.01)
(Continued)

(52) U.S. Cl.
CPC ............. *H04N 5/2628* (2013.01); *B60R 1/00* (2013.01); *B60R 11/02* (2013.01);
(Continued)

(58) Field of Classification Search
CPC .... H04N 5/2628; H04N 7/18; H04N 5/23238; H04N 7/181; G06T 11/00;
(Continued)

(56) References Cited

U.S. PATENT DOCUMENTS 7,161,616 B1 1/2007 Okamoto
2007/0120656 A1* 5/2007 Nakanishi ................ B60R 1/00
340/435

(Continued)

FOREIGN PATENT DOCUMENTS

JP 3300334 7/2002
JP 2012-227699 11/2012

OTHER PUBLICATIONS

Hsu et al, Figh-eye lenses based camera calibration and panoramic image stitching (Year: 2018).*

(Continued)

*Primary Examiner* — Shan E Elahi
(74) *Attorney, Agent, or Firm* — Amin, Turocy & Watson, LLP

(57) ABSTRACT

A bird's-eye view image generation device includes: an image data acquisition unit that acquires periphery image data obtained by photographing a periphery of a vehicle; an obstacle information acquisition unit that acquires positional information of an obstacle detected in the periphery of the vehicle; a bird's-eye view image generation unit that generates a bird's-eye view image obtained by combining periphery images acquired by the image data acquisition unit, the periphery images having been subjected to viewpoint conversion processing so that a virtual viewpoint is positioned at a position at which the vehicle and the obstacle can be overlooked, based on the positional information of the obstacle acquired by the obstacle information acquisition unit; and a display control unit that causes a display panel to display the bird's-eye view image generated by the bird's-eye view image generation unit.

8 Claims, 13 Drawing Sheets

(51) Int. Cl.
*G06K 9/00* (2006.01)
*B60R 1/00* (2006.01)
*H04N 5/232* (2006.01)
*G06T 11/00* (2006.01)
*B60R 11/02* (2006.01)

(52) U.S. Cl.
CPC .......... *G06K 9/00805* (2013.01); *G06T 11/00* (2013.01); *H04N 5/23238* (2013.01); *H04N 7/18* (2013.01); *H04N 7/181* (2013.01); *B60R 2300/105* (2013.01); *B60R 2300/30* (2013.01); *B60R 2300/605* (2013.01); *B60R 2300/607* (2013.01); *G06T 2207/30252* (2013.01)

(58) Field of Classification Search
CPC . G06T 2207/30252; B60R 11/02; B60R 1/00; B60R 2300/605; B60R 2300/105; B60R 2300/607; B60R 2300/30; G06K 9/00805
USPC .......................................................... 348/148
See application file for complete search history.

(56) References Cited

U.S. PATENT DOCUMENTS

| 2009/0073263 | A1* | 3/2009 | Harada | G06T 3/0018 |
| | | | | 348/148 |
| 2010/0134325 | A1* | 6/2010 | Gomi | G03B 37/04 |
| | | | | 340/995.14 |
| 2011/0234802 | A1* | 9/2011 | Yamada | G03B 15/02 |
| | | | | 348/148 |
| 2014/0218531 | A1* | 8/2014 | Michiguchi | B60R 1/00 |
| | | | | 348/148 |
| 2017/0050566 | A1* | 2/2017 | Yamashita | H04N 5/23238 |

OTHER PUBLICATIONS

Extended European Search Report for European Patent Application No. 17898960.4 dated Oct. 16, 2019.

International Search Report and Written Opinion for International Patent Application No. PCT/JP2017/039953 dated Jan. 30, 2018, 11 pages.

* cited by examiner

GENERATING BIRD'S-EYE VIEW IMAGES

CROSS-REFERENCE TO RELATED APPLICATION(S)

This application is a Continuation of PCT international application Ser. No. PCT/JP2017/039953 filed on Nov. 6, 2017 which designates the United States, incorporated herein by reference, and which claims the benefit of priority from Japanese Patent Application No. 2017-036656, filed on Feb. 28, 2017 and Japanese Patent Application No. 2017-036657, filed on Feb. 28, 2017, which are both incorporated herein by reference.

BACKGROUND

The present disclosure relates to a bird's-eye view image generating device, a bird's-eye view image generating system, a bird's-eye view image generating method, and a medium.

There is known a technique of causing a monitor to display a bird's-eye view image obtained by photographing the periphery of a vehicle with a plurality of cameras disposed around the vehicle and performing viewpoint conversion processing on a plurality of photographed images to be combined (for example, refer to Patent Literature 1: Japanese Patent Application Laid-open No. 2012-227699 A). In this technique, when a predetermined condition for a vehicle speed and an obstacle is satisfied, a periphery image displayed on a display unit is switched to another periphery image having a different display range.

SUMMARY

It is an object of the present disclosure to at least partially solve the problems in the conventional technology.

A bird's-eye view image generating device according to the present disclosure includes an image data acquisition unit configured to acquire periphery image data obtained by photographing a periphery of a vehicle, an obstacle information acquisition unit configured to acquire positional information of an obstacle detected in the periphery of the vehicle, a bird's-eye view image generation unit configured to generate a bird's-eye view image obtained by combining periphery images acquired by the image data acquisition unit, the periphery images having been subjected to viewpoint conversion processing so that a virtual viewpoint is positioned at a position at which the virtual viewpoint is positioned to be separated from a position right above the vehicle in at least one of a vehicle width direction and a front and rear direction and not positioned on an extension line from the vehicle to the obstacle so that the vehicle and the obstacle are able to be overlooked, based on the positional information of the obstacle acquired by the obstacle information acquisition unit, and a display control unit configured to cause a display unit to display the bird's-eye view image generated by the bird's-eye view image generation unit.

A bird's-eye view image generating method according to the present disclosure includes an image data acquisition step of acquiring periphery image data obtained by photographing a periphery of a vehicle, an obstacle information acquisition step of acquiring positional information of an obstacle detected in the periphery of the vehicle, a bird's-eye view image generation step of generating a bird's-eye view image obtained by combining periphery images acquired at the image data acquisition step, the periphery images having been subjected to viewpoint conversion processing so that a virtual viewpoint is positioned at a position at which the virtual viewpoint is positioned to be separated from a position right above the vehicle in at least one of a vehicle width direction and a front and rear direction and not positioned on an extension line from the vehicle to the obstacle so that the vehicle and the obstacle are able to be overlooked, based on the positional information of the obstacle acquired at the obstacle information acquisition step, and a display control step of causing a display unit to display the bird's-eye view image generated at the bird's-eye view image generation step.

A non-transitory computer readable recording medium according to the present disclosure stores therein a computer program configured to cause a computer operating as a bird's-eye view image generating device to execute an image data acquisition step of acquiring periphery image data obtained by photographing a periphery of a vehicle, an obstacle information acquisition step of acquiring positional information of an obstacle detected in the periphery of the vehicle, a bird's-eye view image generation step of generating a bird's-eye view image obtained by combining periphery images acquired at the image data acquisition step, the periphery images having been subjected to viewpoint conversion processing so that a virtual viewpoint is positioned at a position at which the virtual viewpoint is positioned to be separated from a position right above the vehicle in at least one of a vehicle width direction and a front and rear direction and not positioned on an extension line from the vehicle to the obstacle so that the vehicle and the obstacle are able to be overlooked, based on the positional information of the obstacle acquired at the obstacle information acquisition step, and a display control step of causing a display unit to display the bird's-eye view image generated at the bird's-eye view image generation step.

DETAILED DESCRIPTION

The following describes embodiments of a bird's-eye view image generating device 40, a bird's-eye view image generating system 1, a bird's-eye view image generating method, and a computer program according to the present disclosure in detail with reference to the attached drawings. The present disclosure is not limited to the following embodiments.

In the following description, a front and rear direction is assumed to be a direction parallel with a traveling direction at the time when a vehicle moves straight forward, a direction from a driver's seat toward a windshield is assumed to be "front" of the front and rear direction, and a direction from the windshield toward the driver's seat is assumed to be "rear" of the front and rear direction. The front and rear direction is assumed to be an X-axis direction. A left and right direction is a direction that is horizontally orthogonal to the front and rear direction. A left side is "left", and a right side is "right" with respect to the windshield. The left and right direction is assumed to be a Y-axis direction. An up and down direction is a direction orthogonal to the front and rear direction and the left and right direction. The up and down direction is assumed to be a Z-axis direction. Thus, the front and rear direction, the left and right direction, and a vertical direction are three-dimensionally orthogonal to each other. In the following description, "front and rear", "left and right", and "up and down" are represented in a state in which the bird's-eye view image generating system 1 is mounted on the vehicle.

First Embodiment

Figure 1:
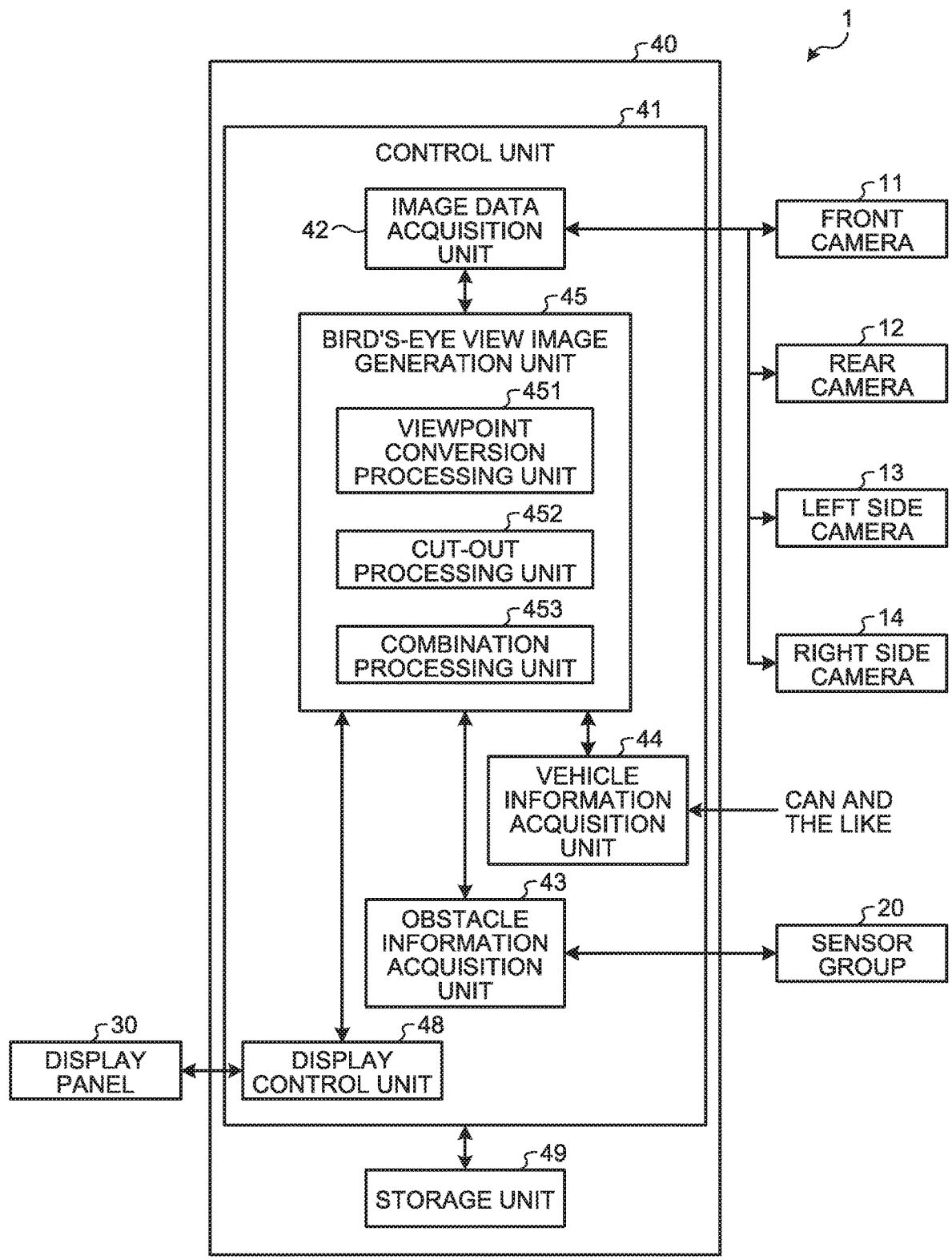
FIG. 1 is a block diagram illustrating a configuration example of a bird's-eye view image generating system according to a first embodiment.

FIG. 1 is a block diagram illustrating a configuration example of a bird's-eye view image generating system according to a first embodiment. The bird's-eye view image generating system 1 is mounted on a vehicle V. In addition to the bird's-eye view image generating system 1 placed in the vehicle V, a portable device that can be used for the vehicle V may be used.

The following describes the bird's-eye view image generating system 1 with reference to FIG. 1. The bird's-eye view image generating system 1 includes a front camera 11, a rear camera 12, a left side camera 13, a right side camera 14, a sensor group (obstacle sensor) 20, a display panel (display unit) 30, and the bird's-eye view image generating device 40.

Figure 2:
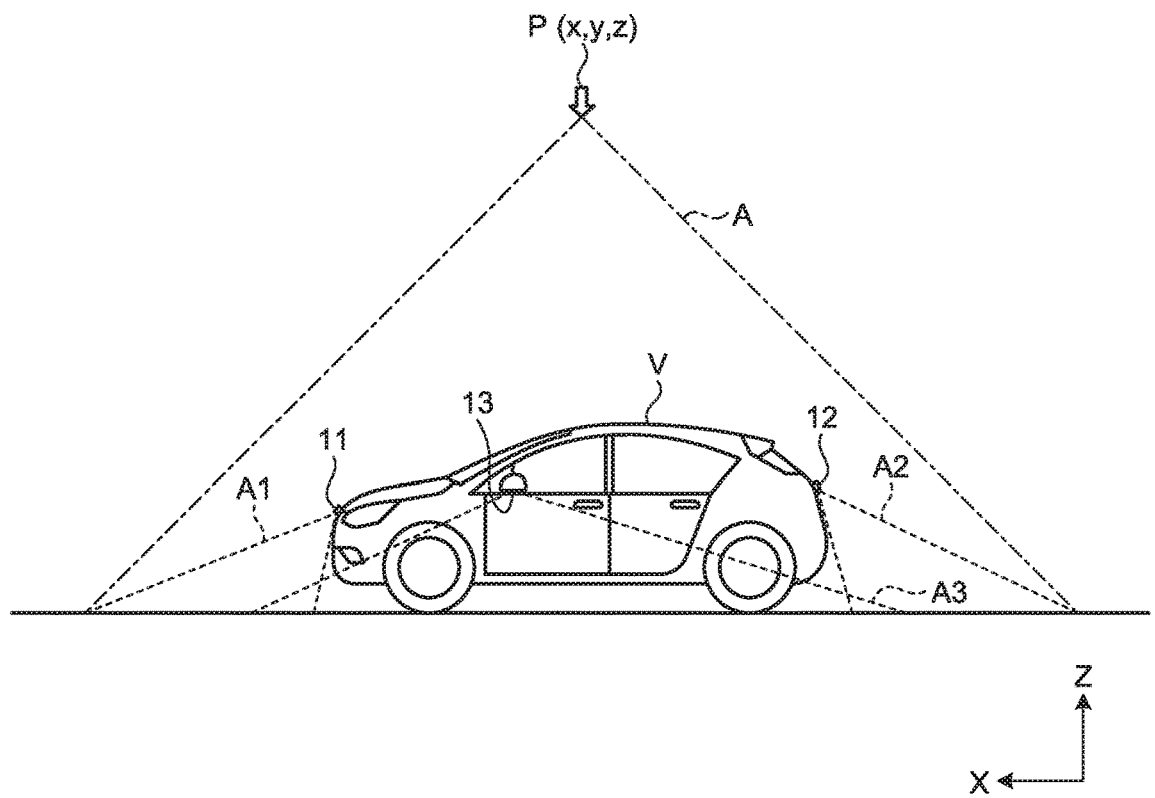
FIG. 2 is a schematic diagram for explaining an example of a position of a virtual viewpoint in the bird's-eye view image generating system according to the first embodiment.

The following describes the front camera 11, the rear camera 12, the left side camera 13, and the right side camera 14 with reference to FIG. 2. FIG. 2 is a schematic diagram for explaining an example of a position of a virtual viewpoint in the bird's-eye view image generating system according to the first embodiment. The front camera 11 is disposed at the front of the vehicle V, and photographs the periphery around the front of the vehicle V. The front camera 11 photographs, for example, a photographing range A1 of about 180°. The front camera 11 outputs a photographed image to an image data acquisition unit 42 of the bird's-eye view image generating device 40.

The rear camera 12 is disposed at the rear of the vehicle V, and photographs the periphery around the rear of the vehicle V. The rear camera 12 photographs, for example, a photographing range A2 of about 180°. The rear camera 12 outputs a photographed image to the image data acquisition unit 42 of the bird's-eye view image generating device 40.

The left side camera 13 is disposed on the left side of the vehicle V, and photographs the periphery around the left side of the vehicle V. The left side camera 13 photographs, for example, a photographing range A3 of about 180°. The left side camera 13 outputs a photographed image to the image data acquisition unit 42 of the bird's-eye view image generating device 40.

The right side camera 14 is disposed on the right side of the vehicle V, and photographs the periphery around the right side of the vehicle V. The right side camera 14 photographs, for example, a photographing range A4 (not illustrated) of about 180°. The right side camera 14 outputs a photographed image to the image data acquisition unit 42 of the bird's-eye view image generating device 40.

With the front camera 11, the rear camera 12, the left side camera 13, and the right side camera 14, the periphery of the vehicle V is photographed in all directions.

Returning to FIG. 1, the sensor group 20 is a detection unit that detects an obstacle Q around the vehicle V. The sensor group 20 can detect the obstacle Q in a range including a display range A of a bird's-eye view image. In the present embodiment, the sensor group 20 includes a front sensor, a rear sensor, a left side sensor, and a right side sensor. The sensor group 20 can perform sensing in a distance from several tens of meters to several hundreds of meters depending on a sensing system. In a case of being used for this object, the sensor group 20 detects the obstacle Q in a distance of about 5 m from the vehicle V. Various systems can be applied to the sensor group 20 such as an infrared sensor, an ultrasonic sensor, a millimeter wave sensor, a sensor based on image recognition, and a combination of a plurality of systems of sensors.

The front sensor is disposed at the front of the vehicle V, and detects the obstacle Q present in a range around the front of the vehicle V. The front sensor detects an object having a height from the ground that may be brought into contact with the vehicle V when the vehicle V moves forward. The front sensor detects, for example, the obstacle Q at a distance of about 5 m from the vehicle V. A detection range of the front sensor overlaps with the photographing range A1 of the front camera 11. The detection range of the front sensor may overlap with part of detection ranges of the left side sensor and the right side sensor. The front sensor is constituted of a combination of a plurality of sensors. Due to this, the front sensor detects subdivided directions of the obstacle Q. The front sensor outputs obstacle information of the detected obstacle Q to an obstacle information acquisition unit 43 of the bird's-eye view image generating device 40.

The rear sensor is disposed at the rear of the vehicle V, and detects the obstacle Q present in a range around the rear of the vehicle V. The rear sensor detects an object having a height from the ground that may be brought into contact with the vehicle V when the vehicle V moves backward. The rear sensor detects, for example, the obstacle Q at a distance of about 5 m from the vehicle V. A detection range of the rear sensor overlaps with the photographing range A2 of the rear camera 12. The detection range of the rear sensor may overlap with part of the detection ranges of the left side sensor and the right side sensor. The rear sensor is constituted of a combination of a plurality of sensors. Due to this, the rear sensor detects subdivided directions of the obstacle Q. The rear sensor outputs obstacle information of the detected obstacle Q to the obstacle information acquisition unit 43 of the bird's-eye view image generating device 40.

The left side sensor is disposed on the left side of the vehicle V, and detects the obstacle Q present in a range around the left side of the vehicle V. The left side sensor detects an object having a height from the ground that may be brought into contact with the vehicle V when the vehicle V moves forward or backward while being steered. The left side sensor detects, for example, the obstacle Q at a distance of about 5 m from the vehicle V. A detection range of the left side sensor overlaps with the photographing range A3 of the left side camera 13. The detection range of the left side sensor may overlap with part of the detection ranges of the front sensor and the rear sensor. The left side sensor is constituted of a combination of a plurality of sensors. Due to this, the left side sensor detects subdivided directions of the obstacle Q. The left side sensor outputs obstacle information of the detected obstacle Q to the obstacle information acquisition unit 43 of the bird's-eye view image generating device 40.

The right side sensor is disposed on the right side of the vehicle V, and detects the obstacle Q present in a range around the right side of the vehicle V. The right side sensor detects an object having a height from the ground that may be brought into contact with the vehicle V when the vehicle V moves forward or backward while being steered. The right side sensor detects, for example, the obstacle Q at a distance of about 5 m from the vehicle V. A detection range of the right side sensor overlaps with the photographing range A4 of the right side camera 14. The detection range of the right side sensor may overlap with part of the detection ranges of the front sensor and the rear sensor. The right side sensor is constituted of a combination of a plurality of sensors. Due to this, the right side sensor detects subdivided directions of the obstacle Q. The right side sensor outputs obstacle information of the detected obstacle Q to the obstacle information acquisition unit 43 of the bird's-eye view image generating device 40.

The display panel 30 is, for example, a display including a liquid crystal display (LCD) or an organic electro-luminescence (organic EL) display. The display panel 30 displays a bird's-eye view image 100 (refer to FIG. 3) based on an image signal output from the bird's-eye view image generating device 40 of the bird's-eye view image generating system 1. The display panel 30 may be dedicated to the bird's-eye view image generating system 1, or may be used by another system including a navigation system at the same time, for example. The display panel 30 is disposed at a position that is easily visually recognized by a driver.

In a case in which the display panel 30 has a horizontally long rectangular shape, the display panel 30 may be divided into a plurality of display ranges. For example, the display panel 30 includes a display range for displaying the bird's-eye view image 100 and a display range for displaying a navigation screen or an audio screen disposed on a side of the display range of the bird's-eye view image 100. The display range for displaying the bird's-eye view image 100 has a vertically long rectangular shape.

The bird's-eye view image generating device 40 includes a control unit 41 and a storage unit 49.

The control unit 41 is, for example, an arithmetic processing device constituted of a central processing unit (CPU) and the like. The control unit 41 loads a computer program stored in the storage unit 49 into a memory, and executes a command included in the computer program. The control unit 41 includes the image data acquisition unit 42, the obstacle information acquisition unit 43, a vehicle information acquisition unit 44, a bird's-eye view image generation unit 45, and a display control unit 48.

The image data acquisition unit 42 acquires periphery image data obtained by photographing the periphery of the vehicle V. More specifically, the image data acquisition unit 42 acquires the periphery image data output from the front camera 11, the rear camera 12, the left side camera 13, and the right side camera 14. The image data acquisition unit 42 outputs the acquired periphery image data to the bird's-eye view image generation unit 45.

The obstacle information acquisition unit 43 acquires the obstacle information of the obstacle Q detected in the periphery of the vehicle V, and specifies a position of the detected obstacle Q on the bird's-eye view image. More specifically, the obstacle information acquisition unit 43 acquires the obstacle information output from the sensor group 20. The obstacle information acquisition unit 43 acquires subdivided directions of the obstacle Q based on an attachment position of a sensor that has output the obstacle information and the detection range of the sensor for the obstacle Q. The obstacle information acquisition unit 43 acquires the obstacle information including a distance to the detected obstacle Q. The obstacle information acquisition unit 43 specifies the position of the obstacle Q on the bird's-eye view image based on the acquired directions and distance of the obstacle Q.

The vehicle information acquisition unit 44 acquires vehicle information to be a trigger for displaying the bird's-eye view image 100 such as a gear operation information of the vehicle V from a controller area network (CAN), various sensors for sensing a state of the vehicle V, and the like. In the present embodiment, the vehicle information includes information indicating a traveling direction of the vehicle V. The vehicle information acquisition unit 44 outputs the acquired vehicle information to the bird's-eye view image generation unit 45.

By performing viewpoint conversion processing on pieces of the periphery image data acquired by the image data acquisition unit 42 to be combined, the bird's-eye view image generation unit 45 generates the bird's-eye view image 100 having a virtual viewpoint P on an upper side of the vehicle V.

The following describes the virtual viewpoint P with reference to FIG. 2. The virtual viewpoint P is positioned above the center of the vehicle V. The virtual viewpoint P is a viewpoint of looking down the vehicle V from right above the center thereof. The "center of the vehicle V" is the center in a vehicle width direction of the vehicle V and the center in the front and rear direction thereof. "Right above the vehicle V" is a position on a perpendicular with respect to a reference surface of the vehicle V. The "reference surface" is, in a case in which the vehicle V is positioned on a horizontal and flat road surface, a plane horizontal to the road surface. A position of the virtual viewpoint P is assumed to be (x, y, z).

Figure 3:
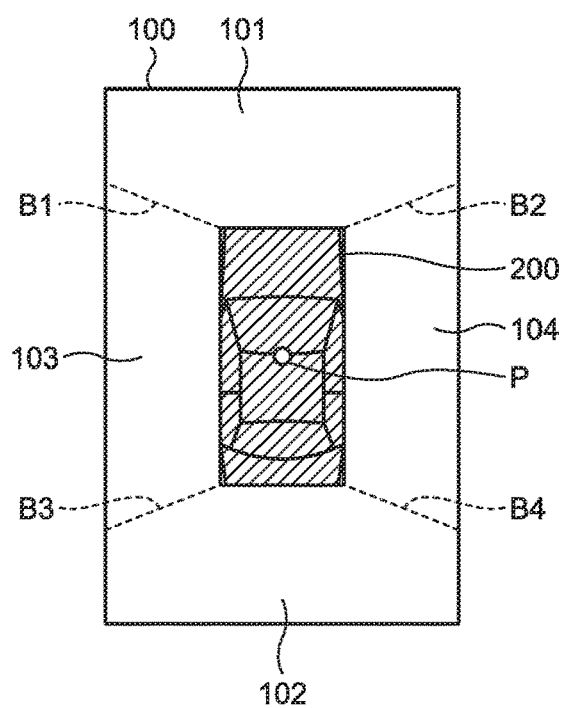
FIG. 3 is a diagram illustrating an example of a bird's-eye view image generated by the bird's-eye view image generating system according to the first embodiment.

The following describes the generated bird's-eye view image 100 with reference to FIG. 3. FIG. 3 is a diagram illustrating an example of the bird's-eye view image generated by the bird's-eye view image generating system according to the first embodiment. The bird's-eye view image 100 is displayed by combining periphery images in the display range A on which viewpoint conversion processing is performed with the virtual viewpoint P. The bird's-eye view image 100 includes a front image 101, a rear image 102, a left side image 103, and a right side image 104. A display area of the front image 101 and a display area of the rear image 102 have the same size. A display area of the left side image 103 and a display area of the right side image 104 have the same size. In a center part of the bird's-eye view image 100, a host vehicle icon 200 indicating the vehicle V is displayed. The host vehicle icon 200 indicates a form of looking down the vehicle V from right above.

FIG. 3 illustrates, for explanation, oblique dashed lines indicating a combining boundary B1 between the front image 101 and the left side image 103, a combining boundary B2 between the front image 101 and the right side image 104, a combining boundary B3 between the rear image 102 and the left side image 103, and a combining boundary B4 between the rear image 102 and the right side image 104, but the dashed lines are not necessarily displayed in the bird's-eye view image 100 that is actually displayed on the display panel 30. The same applies to the other drawings. In the following description, in a case in which the combining boundary B1, the combining boundary B2, the combining boundary B3, and the combining boundary B4 are not required to be specifically distinguished from each other, each of them is referred to as a combining boundary B.

In a case in which there is an obstacle satisfying a predetermined condition, the bird's-eye view image generation unit 45 generates a bird's-eye view image obtained by performing viewpoint conversion processing on periphery images acquired by the image data acquisition unit 42 to be combined to cause a virtual viewpoint PA to be positioned being separated from the virtual viewpoint P positioned right above the vehicle V in at least one of the vehicle width direction and the front and rear direction so that the vehicle V and the obstacle Q can be overlooked, based on positional information of the obstacle Q acquired by the obstacle information acquisition unit 43.

The predetermined condition is a condition for detecting the obstacle Q. In the present embodiment, the predetermined condition is that the obstacle Q is positioned in the traveling direction of the vehicle V. In a case in which the obstacle Q is positioned in the traveling direction of the vehicle V, it is determined that the predetermined condition is satisfied, and the obstacle Q is detected. For example, in a case in which the obstacle Q is positioned in the rear of a front end of the vehicle V when the vehicle V moves backward, it is determined that the predetermined condition is satisfied, and the obstacle Q is detected. More specifically, in a case in which a sensor of the sensor group 20 that detects the obstacle Q at the rear of the front end of the vehicle V detects the obstacle Q when the vehicle V moves backward, the control unit 41 determines that the predetermined condition is satisfied, and detects the obstacle Q. The present embodiment describes a case in which the vehicle V moves backward.

The bird's-eye view image generation unit 45 includes a viewpoint conversion processing unit 451, a cut-out processing unit 452, and a combination processing unit 453.

The viewpoint conversion processing unit 451 performs viewpoint conversion processing on the periphery image data acquired by the image data acquisition unit 42 so as to look down the vehicle V from the above virtual viewpoint P. More specifically, the viewpoint conversion processing unit 451 generates an image subjected to viewpoint conversion processing based on the periphery image data photographed by the front camera 11, the rear camera 12, the left side camera 13, and the right side camera 14. As a method for viewpoint conversion processing, any known method can be used, and the method is not limited. The viewpoint conversion processing unit 451 outputs the periphery image data subjected to the viewpoint conversion processing to the cut-out processing unit 452.

In a case in which there is the obstacle Q satisfying the predetermined condition, the viewpoint conversion processing unit 451 performs the viewpoint conversion processing to generate an image so as to cause the virtual viewpoint PA to be positioned being separated from the virtual viewpoint P positioned right above the vehicle V in at least one of the vehicle width direction and the front and rear direction so that the vehicle V and the obstacle Q can be overlooked, based on the positional information of the obstacle Q acquired by the obstacle information acquisition unit 43. More specifically, when there is the obstacle Q positioned in the traveling direction of the vehicle V, the viewpoint conversion processing unit 451 generates an image subjected to the viewpoint conversion processing by causing the position of the virtual viewpoint to be the virtual viewpoint PA separated from the virtual viewpoint P so that a relative positional relation between the vehicle V and the obstacle Q can be recognized. The viewpoint conversion processing unit 451 outputs the periphery image data subjected to the viewpoint conversion processing to the cut-out processing unit 452.

"A relative positional relation between the vehicle V and the obstacle Q can be recognized" means that the vehicle V and the obstacle Q are displayed without overlapping with each other in the bird's-eye view image. Additionally, "a relative positional relation between the vehicle V and the obstacle Q can be recognized" means that the relative positional relation between the vehicle V and the obstacle Q in the bird's-eye view image is changed depending on a change in a relative distance between the vehicle V and the obstacle Q when the vehicle V or the obstacle Q moves.

The virtual viewpoint PA is preferably positioned so that an angle of view of the bird's-eye view image in a direction in which the obstacle is detected is substantially the same as an angle of view of the bird's-eye view image 100 from the virtual viewpoint P. The bird's-eye view image 100 from the virtual viewpoint P and the bird's-eye view image obtained by moving the virtual viewpoint to the virtual viewpoint PA use the same image, but a region of an appropriate virtual projection surface is used for the bird's-eye view image corresponding to the position of the virtual viewpoint. Thus, in a case in which the angle of view of the bird's-eye view image is largely changed in the direction in which the obstacle is detected, the position of the obstacle on the bird's-eye view image can be easily grasped when the position of the virtual viewpoint is changed. Specifically, in a case in which the virtual viewpoint PA is assumed to be in the rear of the vehicle V, the rear image in the direction in which the virtual viewpoint PA is positioned has an angle of view substantially the same as a cut-out angle of view of the rear image 102 from the virtual viewpoint P, and the front image in a direction opposite to the virtual viewpoint PA across the vehicle V has a cut-out angle of view that is wider toward the front of the vehicle than that of the front image 101 from the virtual viewpoint P. Accordingly, the bird's-eye view image that seems to be looked down from the virtual viewpoint PA can be generated.

Figure 4:
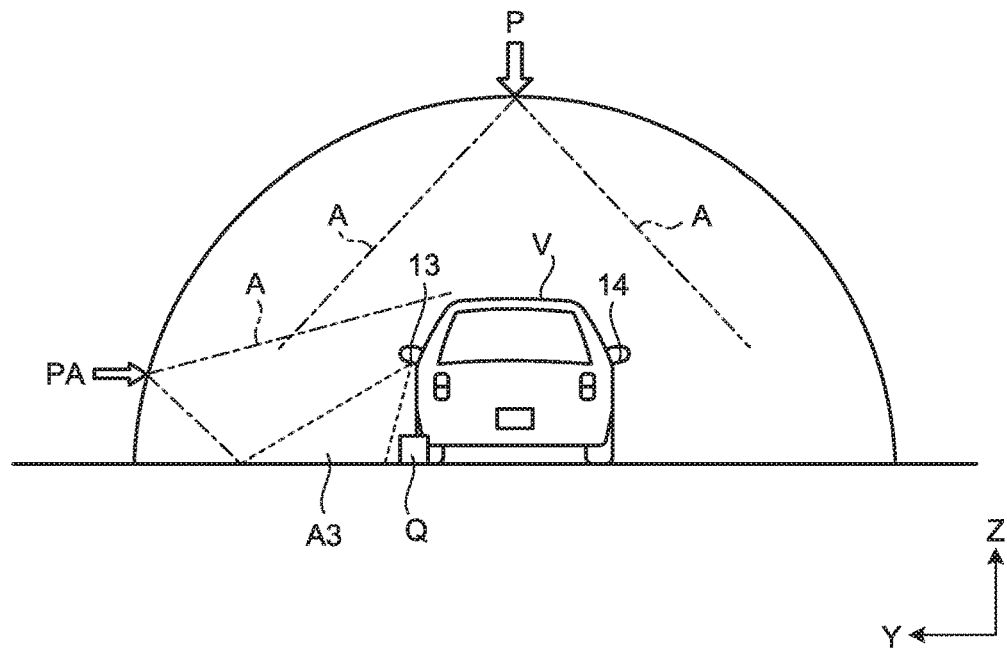
FIG. 4 is a schematic diagram for explaining a position of a virtual viewpoint in the bird's-eye view image generating system according to the first embodiment.
Figure 5:
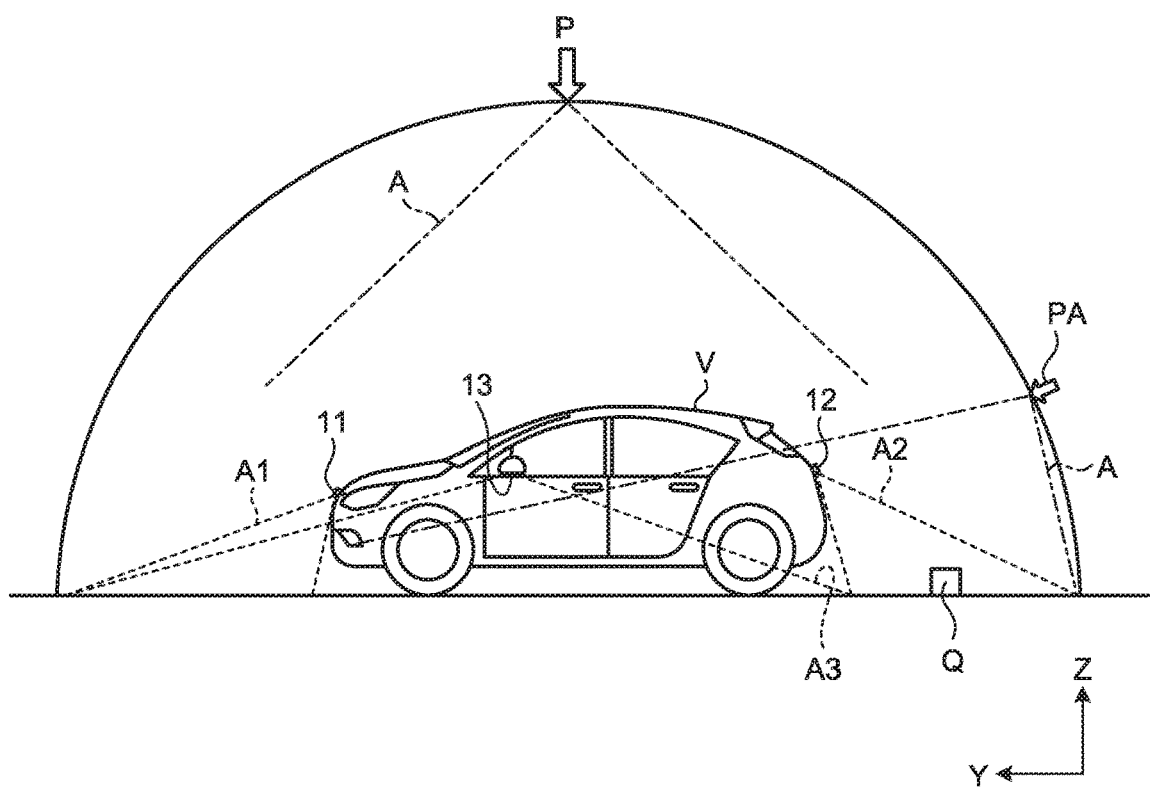
FIG. 5 is a schematic diagram for explaining a position of a virtual viewpoint in the bird's-eye view image generating system according to the first embodiment.

The virtual viewpoint PA separated from the virtual viewpoint P in the vehicle width direction or the front and rear direction is positioned on a curved surface centered around the vehicle V as illustrated in FIG. 4 and FIG. 5. FIG. 4 is a schematic diagram for explaining the position of the virtual viewpoint in the bird's-eye view image generating system according to the first embodiment. FIG. 5 is a schematic diagram for explaining the position of the virtual viewpoint in the bird's-eye view image generating system according to the first embodiment. The angle of view of the bird's-eye view image from the virtual viewpoint PA on the curved surface is the same as the angle of view of the bird's-eye view image 100 from the virtual viewpoint P, so that the size of the obstacle Q displayed in the bird's-eye view image is not changed. Thus, even when the position of the virtual viewpoint is changed, the bird's-eye view image in which the relative positional relation between the obstacle Q and the vehicle V can be intuitively grasped is generated.

The virtual viewpoint PA is preferably disposed at a position separated from the center of the vehicle V by a distance larger than a distance between the center of the vehicle V and the obstacle Q. Accordingly, the bird's-eye view image in which the relative positional relation between the obstacle Q and the vehicle V can be easily recognized is generated.

Figure 6:
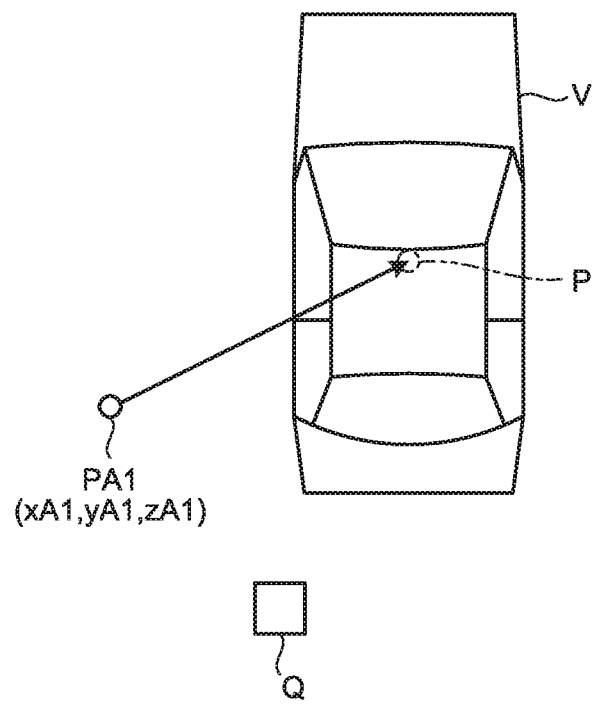
FIG. 6 is a schematic diagram for explaining an example of a position of a virtual viewpoint in the bird's-eye view image generating system according to the first embodiment.
Figure 7:
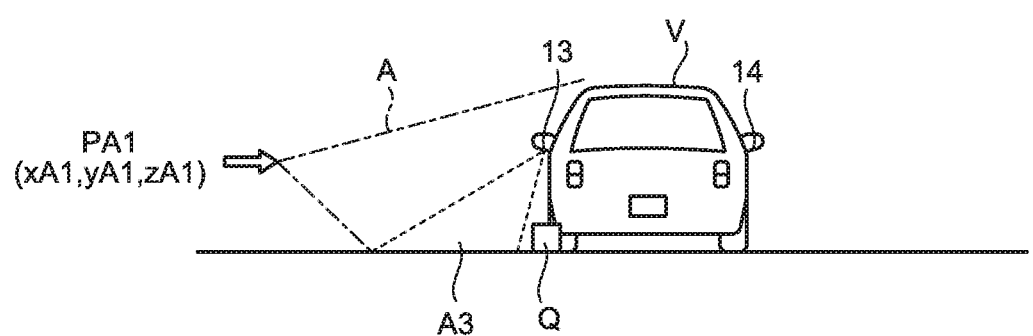
FIG. 7 is a schematic diagram for explaining an example of a position of a virtual viewpoint in the bird's-eye view image generating system according to the first embodiment.

In the present embodiment, as illustrated in FIG. 6 and FIG. 7, when the obstacle Q positioned on a left rear side of the vehicle V is detected, the viewpoint conversion processing unit 451 generates an image obtained by performing the viewpoint conversion processing on the virtual viewpoint P to be a virtual viewpoint PA1 on the left rear side. FIG. 6 is a schematic diagram for explaining an example of the position of the virtual viewpoint in the bird's-eye view image generating system according to the first embodiment. FIG. 7 is a schematic diagram for explaining an example of the position of the virtual viewpoint in the bird's-eye view image generating system according to the first embodiment. A position of the virtual viewpoint PA1 is represented as (xA1, yA1, zA1).

The following describes the virtual viewpoint PA1. In the present embodiment, the virtual viewpoint PA1 is positioned on the left rear side of the vehicle V. The virtual viewpoint PA1 is positioned on a left front side of the obstacle Q when viewed in the Z-axis direction. The virtual viewpoint PA1 is positioned on a left rear side of the virtual viewpoint P when viewed in the Z-axis direction. The virtual viewpoint PA1 is separated from the center of the vehicle V by a distance larger than the distance between the center of the vehicle V and the obstacle Q. The virtual viewpoint PA1 is a viewpoint of obliquely looking down the vehicle V from the left rear side.

The cut-out processing unit 452 performs cut-out processing of cutting out an image of a predetermined range from the periphery image data subjected to the viewpoint conversion processing. The cut-out processing unit 452 cuts out a front cut-out range from the periphery image data from the front camera 11 that has been subjected to the viewpoint conversion processing. The cut-out processing unit 452 cuts out a rear cut-out range from the periphery image data from the rear camera 12 that has been subjected to the viewpoint conversion processing. The cut-out processing unit 452 cuts out a left side cut-out range from the periphery image data from the left side camera 13 that has been subjected to the viewpoint conversion processing. The cut-out processing unit 452 cuts out a right side cut-out range from the periphery image data from the right side camera 14 that has been subjected to the viewpoint conversion processing. The cut-out processing unit 452 outputs image data of the images subjected to the cut-out processing to the combination processing unit 453.

The front cut-out range is a range of cutting out the front image 101 from the periphery image data subjected to the viewpoint conversion processing. The front cut-out range is a range in front of a front end part of the vehicle V. The rear cut-out range is a range of cutting out the rear image 102 from the periphery image data subjected to the viewpoint conversion processing. The rear cut-out range is a range in the rear of a rear end part of the vehicle V. The left side cut-out range is a range of cutting out the left side image 103 from the periphery image data subjected to the viewpoint conversion processing. The left side cut-out range is a range on the left of the left side part of the vehicle V. The right side cut-out range is a range of cutting out the right side image 104 from the periphery image data subjected to the viewpoint conversion processing. The right side cut-out range is a range on the right of the right side part of the vehicle V.

The combination processing unit 453 combines a plurality of images cut out by the cut-out processing unit 452 to generate the bird's-eye view image. The combination processing unit 453 outputs the generated bird's-eye view image to the display control unit 48.

In a case of combining the images subjected to the viewpoint conversion processing, the combination processing unit 453 combines a host vehicle icon imitating a host vehicle viewed from the virtual viewpoint with the center part of the combined bird's-eye view image. In a case in which the position of the virtual viewpoint is the virtual viewpoint P of looking down the vehicle V from right above, the host vehicle icon has a form that seems to be looked down from right above like the host vehicle icon 200 illustrated in FIG. 3. In contrast, in a case of setting the position of the virtual viewpoint to be separated from the virtual viewpoint P, it is preferable that the host vehicle icon has a form such that the host vehicle is obliquely looked down from the virtual viewpoint. In a case of such a form, in the bird's-eye view image of an opposite side of the virtual viewpoint across the host vehicle, a range close to the host vehicle is naturally hidden by the host vehicle icon. Even in such a case, the host vehicle icon preferably has a display form such that a blind spot due to the host vehicle icon is not generated. For example, the host vehicle icon may be semipermeable. For example, the host vehicle icon may have a frame shape representing an external shape.

Returning to FIG. 1, the display control unit 48 causes the display panel 30 to display the bird's-eye view image.

The storage unit 49 stores data required for various kinds of processing performed by the bird's-eye view image generating device 40 and results of various kinds of processing. The storage unit 49 is, for example, a semiconductor memory element such as a random access memory (RAM), a read only memory (ROM), and a flash memory, or a storage device such as a hard disk and an optical disc.

Figure 8:
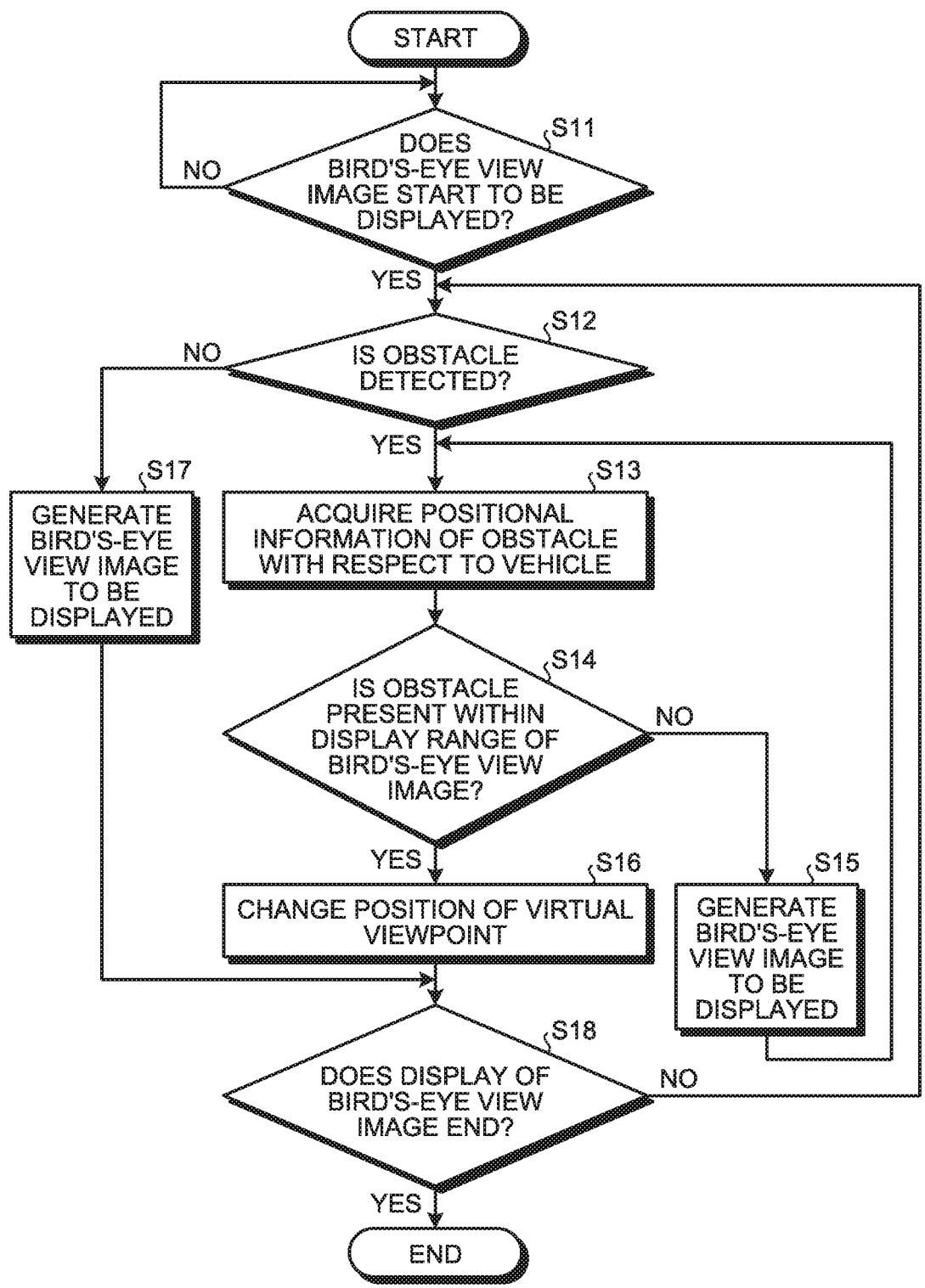
FIG. 8 is a flowchart illustrating a processing procedure of the bird's-eye view image generating system according to the first embodiment.

Next, the following describes a processing procedure of the bird's-eye view image generating device 40 in the bird's-eye view image generating system 1 with reference to FIG. 8. FIG. 8 is a flowchart illustrating the processing procedure in the bird's-eye view image generating system according to the first embodiment.

When the bird's-eye view image generating system 1 is started, the control unit 41 causes the image data acquisition unit 42 to acquire the periphery image data. The control unit 41 causes the obstacle information acquisition unit 43 to acquire the obstacle information.

The control unit 41 determines whether to start to display the bird's-eye view image (Step S11). In the present embodiment, the control unit 41 determines whether to start to display the bird's-eye view image based on whether there is a backward movement trigger. The backward movement trigger means, for example, that a shift position is switched to a "reverse position". Alternatively, the backward movement trigger means that the traveling direction of the vehicle V is switched to the rear of the vehicle V. If there is no backward movement trigger, the control unit 41 determines not to start to display the bird's-eye view image (No at Step S11), and performs the process at Step S11 again. If there is the backward movement trigger, the control unit 41 determines to start to display the bird's-eye view image (Yes at Step S11), and advances the process to Step S12. The trigger for starting display of the bird's-eye view image is not limited to the backward movement trigger, and optional triggers may be applied such as a user operation, an obstacle detection result, and the time when the vehicle stops.

The control unit 41 determines whether the obstacle Q is detected (Step S12). More specifically, the control unit 41 determines whether the obstacle information acquisition unit 43 acquires the obstacle information of the obstacle Q satisfying the predetermined condition. If it is determined that the obstacle information of the obstacle Q satisfying the predetermined condition is acquired (Yes at Step S12), the control unit 41 advances the process to Step S13. If it is determined that the obstacle information of the obstacle Q satisfying the predetermined condition is not acquired (No at Step S12), the control unit 41 advances the process to Step S17.

The control unit 41 acquires the positional information of the obstacle Q with respect to the vehicle V (Step S13). More specifically, the control unit 41 causes the obstacle information acquisition unit 43 to acquire the position of the obstacle Q on the bird's-eye view image based on the acquired obstacle information. The control unit 41 advances the process to Step S14.

The control unit 41 determines whether the obstacle Q is positioned within the display range A of the bird's-eye view image (Step S14). More specifically, the control unit 41 determines whether the obstacle Q is present within the display range A of the bird's-eye view image based on the positional information of the obstacle Q acquired at Step S13. If it is determined that the obstacle Q is present within the display range A of the bird's-eye view image (Yes at Step S14), the control unit 41 advances the process to Step S16. If it is determined that the obstacle Q is not present within the display range A of the bird's-eye view image (No at Step S14), the control unit 41 advances the process to Step S15.

The control unit 41 generates the bird's-eye view image 100 to be displayed (Step S15). More specifically, the control unit 41 causes the bird's-eye view image generation unit 45 to perform the viewpoint conversion processing on the periphery image data acquired by the image data acquisition unit 42 so that the vehicle V is looked down from above with the virtual viewpoint P to generate the bird's-eye view image 100, and causes the display panel 30 to display the generated bird's-eye view image 100. The control unit 41 advances the process to Step S13.

The control unit 41 changes the position of the virtual viewpoint (Step S16). More specifically, the control unit 41 causes the bird's-eye view image generation unit 45 to generate a bird's-eye view image from the virtual viewpoint PA by changing the position of the virtual viewpoint P of the bird's-eye view image 100, and causes the display panel 30 to display the generated bird's-eye view image. The control unit 41 advances the process to Step S18.

In the present embodiment, the control unit 41 causes the bird's-eye view image generation unit 45 to generate an image obtained by performing the viewpoint conversion processing on the virtual viewpoint P to be the virtual viewpoint PA1 on the left rear side, and causes the display panel 30 to display the generated image.

The control unit 41 generates the bird's-eye view image 100 to be displayed (Step S17). The control unit 41 performs the same process as the process at Step S15.

The control unit 41 determines whether to end display of the bird's-eye view image (Step S18). More specifically, the control unit 41 determines whether to end display of the bird's-eye view image based on whether there is a backward movement end trigger. The backward movement end trigger means, for example, that the shift position is switched from the "reverse position" to another position. If there is the backward movement end trigger, the control unit 41 determines to end display of the bird's-eye view image (Yes at Step S18), and ends the process. If there is no backward movement end trigger, the control unit 41 determines not to end display of the bird's-eye view image (No at Step S18), and returns the process to Step S12 to be continued.

In this way, in a case in which the obstacle Q is detected in the traveling direction, the bird's-eye view image generating system 1 generates the bird's-eye view image obtained by changing the position of the virtual viewpoint to the virtual viewpoint PA separated from the virtual viewpoint P that is positioned right above the vehicle V.

As described above, in the present embodiment, in a case in which the obstacle Q is detected in the traveling direction, the bird's-eye view image is generated by changing the position of the virtual viewpoint to the virtual viewpoint PA. Due to this, in the present embodiment, in a case in which the obstacle Q is detected in the traveling direction, the position of the virtual viewpoint can be shifted to display the bird's-eye view image representing the relative positional relation between the obstacle Q and the vehicle V. According to the present embodiment, whether the obstacle Q is brought into contact with the vehicle V can be intuitively recognized from the bird's-eye view image. In this way, according to the present embodiment, the obstacle Q can be appropriately displayed in the bird's-eye view image. According to the present embodiment, visibility of the obstacle Q in the bird's-eye view image can be improved. According to the present embodiment, the obstacle Q around the vehicle can be displayed to be appropriately checked.

In the present embodiment, for example, the bird's-eye view image from the virtual viewpoint PA can be displayed as if a person guides the vehicle V coming closer to the obstacle Q while standing near a position at which the obstacle Q is detected and checking both of the obstacle Q and the vehicle V. Due to this, whether the obstacle Q is brought into contact with the vehicle V can be more easily recognized from the bird's-eye view image as compared with the bird's-eye view image 100 from the virtual viewpoint P that is positioned right above the vehicle V.

In the present embodiment, the virtual viewpoint PA is at a position at which the angle of view of the generated bird's-eye view image is substantially the same as the angle of view of the bird's-eye view image 100 from the virtual viewpoint P. Due to this, the size of the obstacle Q displayed in the bird's-eye view image from the virtual viewpoint PA is the same as the size of the obstacle Q displayed in the bird's-eye view image 100. According to the present embodiment, the bird's-eye view image can be generated so that a relative distance between the obstacle Q and the vehicle V can be easily recognized even when the position of the virtual viewpoint is changed.

Second Embodiment

Figure 9:
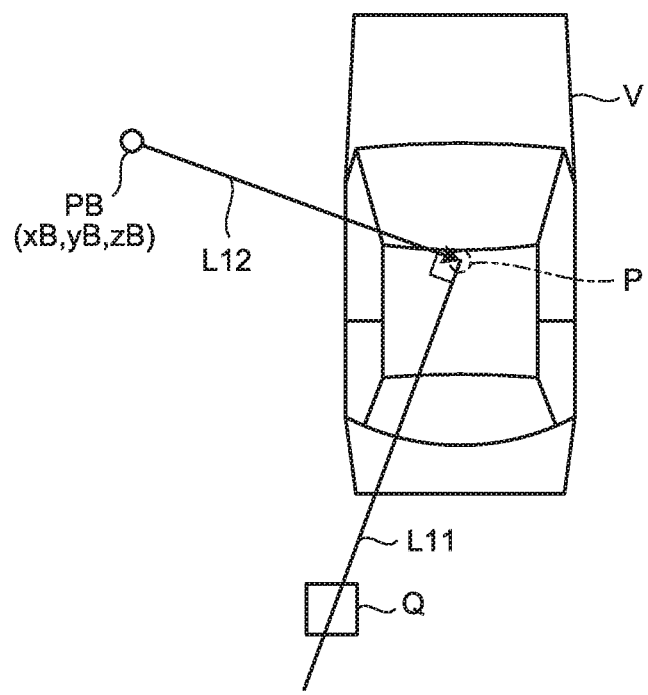
FIG. 9 is a schematic diagram for explaining an example of a position of a virtual viewpoint in a bird's-eye view image generating system according to a second embodiment.

The following describes the bird's-eye view image generating system 1 according to the present embodiment with reference to FIG. 9. FIG. 9 is a schematic diagram for explaining an example of the position of the virtual viewpoint in the bird's-eye view image generating system according to a second embodiment. A basic configuration of the bird's-eye view image generating system 1 is the same as that of the bird's-eye view image generating system 1 according to the first embodiment. In the following description, the same component as that of the bird's-eye view image generating system 1 is denoted by the same reference numeral or a corresponding reference numeral, and detailed description thereof will not be repeated. In the bird's-eye view image generating system 1 according to the present embodiment, the processing performed by the viewpoint conversion processing unit 451 of the bird's-eye view image generation unit 45 is different from that in the bird's-eye view image generating system 1 according to the first embodiment.

In a case in which the obstacle Q acquired by the obstacle information acquisition unit 43 is positioned in the traveling direction of the vehicle V, the viewpoint conversion processing unit 451 generates an image obtained by performing viewpoint conversion processing to make a virtual viewpoint PB that is positioned based on a straight line L12 orthogonal to an extension line L11 from the center of the vehicle V to the obstacle Q. In the present embodiment, in a case in which the obstacle Q is positioned in the traveling direction of the vehicle V, the viewpoint conversion processing unit 451 generates an image obtained by performing viewpoint conversion processing to make the virtual viewpoint PB that is positioned on the straight line L12 orthogonal to the extension line L11 from the center of the vehicle V to the obstacle Q.

In the present embodiment, in a case in which the obstacle Q positioned on the rear side is detected, the viewpoint conversion processing unit 451 generates an image obtained by performing viewpoint conversion processing to make the virtual viewpoint PB on the left front side of the virtual viewpoint P. A position of the virtual viewpoint PB is represented as (xB, yB, zB).

The following describes the virtual viewpoint PB. In the present embodiment, the virtual viewpoint PB is positioned on the left front side of the vehicle V. The virtual viewpoint PB is positioned on the left front side of the obstacle Q when viewed in the Z-axis direction. The virtual viewpoint PB is positioned on the left front side of the virtual viewpoint P when viewed in the Z-axis direction. The virtual viewpoint PB is separated from the center of the vehicle V by a distance larger than the distance between the center of the vehicle V and the obstacle Q. The virtual viewpoint PB is a viewpoint of obliquely looking down the vehicle V from the left front side.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate the bird's-eye view image from the virtual viewpoint PB that is positioned on the straight line L12 orthogonal to the extension line L11 from the vehicle V to the obstacle Q, and causes the display panel 30 to display the generated bird's-eye view image. The control unit 41 advances the process to Step S18.

As described above, in the present embodiment, in a case in which the obstacle Q in the traveling direction is detected, the bird's-eye view image from the virtual viewpoint PB is generated, the virtual viewpoint PB positioned on the straight line L12 orthogonal to the extension line L11 from the center of the vehicle V to the obstacle Q. According to the present embodiment, in a case in which the obstacle Q in the traveling direction is detected, the position of the virtual viewpoint can be shifted to display the bird's-eye view image representing the relative positional relation between the obstacle Q and the vehicle V. According to the present embodiment, whether the obstacle Q is brought into contact with the vehicle V can be intuitively recognized from the bird's-eye view image. In this way, according to the present embodiment, the obstacle Q can be appropriately displayed in the bird's-eye view image. According to the present embodiment, visibility of the obstacle Q in the bird's-eye view image can be improved. According to the present embodiment, the obstacle Q around the vehicle can be displayed to be appropriately checked. In the present embodiment, the position of the virtual viewpoint PB is set to be positioned on the straight line L12 orthogonal to the extension line L11 from the center of the vehicle V to the obstacle Q, so that the vehicle V and the obstacle Q can be appropriately checked from the position of the virtual viewpoint PB.

According to the present embodiment, for example, the bird's-eye view image from the virtual viewpoint PB can be displayed as if a person guides the vehicle V moving away from the obstacle Q while standing near a side on which the obstacle Q is detected and checking both of the obstacle Q and the vehicle V. Due to this, whether the obstacle Q is brought into contact with the vehicle V can be more easily recognized from the bird's-eye view image as compared with the bird's-eye view image 100 from the virtual viewpoint P that is positioned right above the vehicle V.

Third Embodiment

Figure 10:
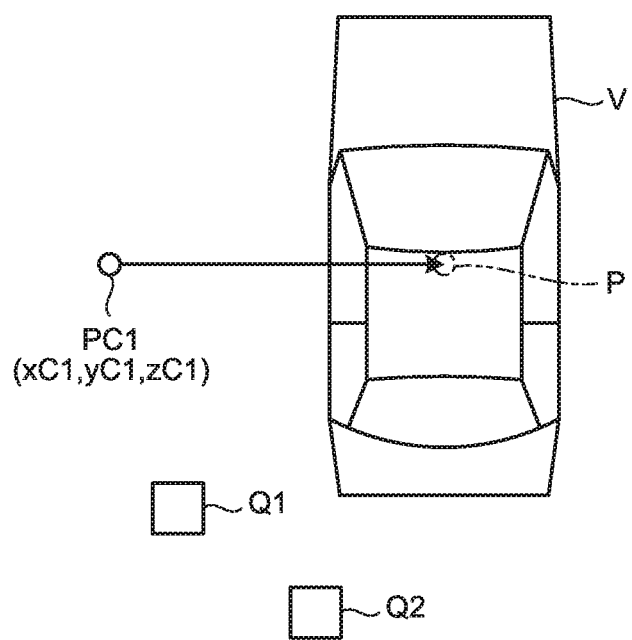
FIG. 10 is a schematic diagram for explaining an example of a position of a virtual viewpoint in a bird's-eye view image generating system according to a third embodiment.
Figure 11:
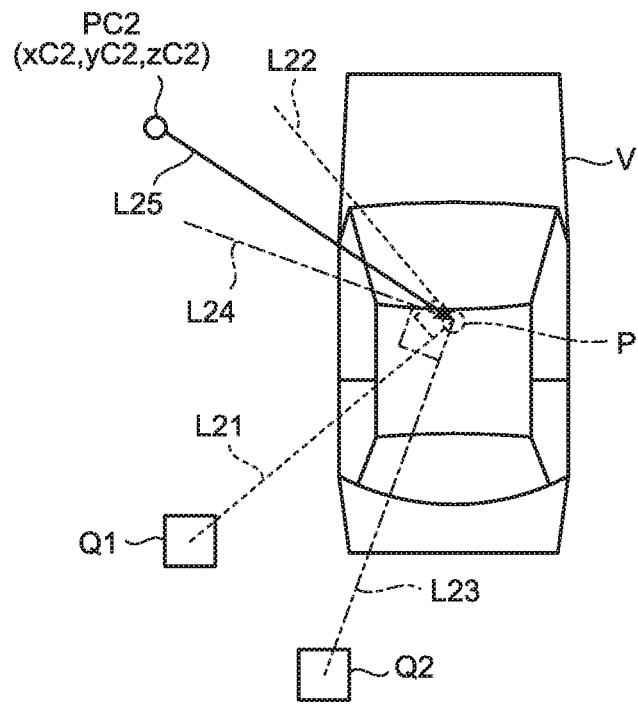
FIG. 11 is a schematic diagram for explaining another example of a position of a virtual viewpoint in the bird's-eye view image generating system according to the third embodiment.
Figure 12:
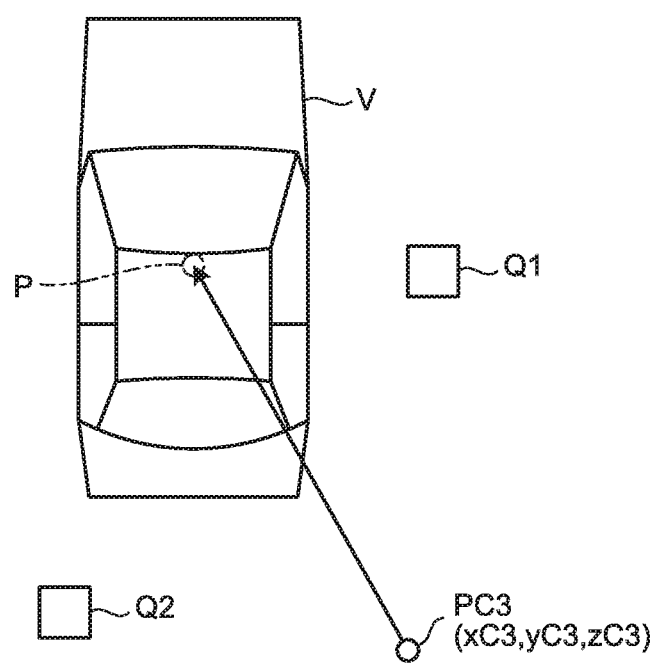
FIG. 12 is a schematic diagram for explaining another example of a position of a virtual viewpoint in the bird's-eye view image generating system according to the third embodiment.
Figure 13:
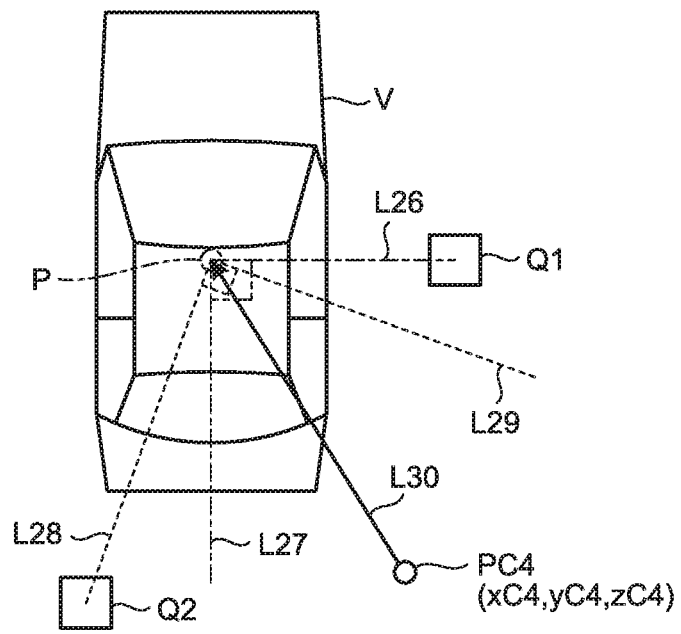
FIG. 13 is a schematic diagram for explaining another example of a position of a virtual viewpoint in the bird's-eye view image generating system according to the third embodiment.

The following describes the bird's-eye view image generating system 1 according to the present embodiment with reference to FIG. 10 to FIG. 13. FIG. 10 is a schematic diagram for explaining an example of the position of the virtual viewpoint in the bird's-eye view image generating system according to a third embodiment. FIG. 11 is a schematic diagram for explaining another example of the position of the virtual viewpoint in the bird's-eye view image generating system according to the third embodiment. FIG. 12 is a schematic diagram for explaining another example of the position of the virtual viewpoint in the bird's-eye view image generating system according to the third embodiment. FIG. 13 is a schematic diagram for explaining another example of the position of the virtual viewpoint in the bird's-eye view image generating system according to the third embodiment. In the bird's-eye view image generating system 1 according to the present embodiment, processing performed by the viewpoint conversion processing unit 451 of the bird's-eye view image generation unit 45 is different from that in the bird's-eye view image generating system 1 according to the first embodiment. In the present embodiment, an obstacle Q1 and an obstacle Q2 are present.

The viewpoint conversion processing unit 451 generates an image obtained by performing viewpoint conversion processing on the periphery images acquired by the image data acquisition unit 42 to make a virtual viewpoint separated from the virtual viewpoint P that is positioned right above the vehicle V so that the vehicle V and a plurality of obstacles Q can be overlooked based on positional information of the obstacles Q acquired by the obstacle information acquisition unit 43.

In the present embodiment, as illustrated in FIG. 10, in a case in which the obstacles Q positioned on the left rear side of the vehicle V are detected, the viewpoint conversion processing unit 451 generates an image obtained by performing viewpoint conversion processing to make a virtual viewpoint PC1 on the left side of the virtual viewpoint P. A position of the virtual viewpoint PC1 is represented as (xC1, yC1, zC1).

The following describes the virtual viewpoint PC1. In the present embodiment, the virtual viewpoint PC1 is positioned on the left side of the vehicle V. The virtual viewpoint PC1 is positioned on the left front side of the obstacle Q1 and the obstacle Q2 when viewed in the Z-axis direction. The virtual viewpoint PA1 is positioned on the left side of the virtual viewpoint P when viewed in the Z-axis direction. The virtual viewpoint PC1 is separated from the center of the vehicle V by a distance larger than a distance between the center of the vehicle V and the obstacle Q1 and a distance between the center of the vehicle V and the obstacle Q2. The virtual viewpoint PC1 is a viewpoint of obliquely looking down the vehicle V from the left side.

Alternatively, as illustrated in FIG. 11, in a case in which the obstacle Q1 and the obstacle Q2 positioned on the left rear side of the vehicle V are detected, the viewpoint conversion processing unit 451 may generate a bird's-eye view image from a virtual viewpoint PC2 positioned on a bisector L25 of a straight line L22 orthogonal to an extension line L21 from the center of the vehicle V to the obstacle Q1 and a straight line L24 orthogonal to an extension line L23 from the center of the vehicle V to the obstacle Q2. The position of the virtual viewpoint PC2 is represented as (xC2, yC2, zC2).

The following describes the virtual viewpoint PC2. In the present embodiment, the virtual viewpoint PC2 is positioned on the left front side of the vehicle V. The virtual viewpoint PC2 is positioned on the left front side of the obstacle Q1 and the obstacle Q2 when viewed in the Z-axis direction. The virtual viewpoint PC2 is positioned on the left front side of the virtual viewpoint P when viewed in the Z-axis direction. The virtual viewpoint PC2 is separated from the center of the vehicle V by a distance larger than the distance between the center of the vehicle V and the obstacle Q1 and a distance between the center of the vehicle V and the obstacle Q2. The virtual viewpoint PC2 is a viewpoint of obliquely looking down the vehicle V from the left front side.

Alternatively, as illustrated in FIG. 12, in a case in which the obstacle Q1 positioned on the right side of the vehicle V and the obstacle Q2 positioned on the left rear side of the vehicle V are detected, the viewpoint conversion processing unit 451 may generate an image obtained by performing viewpoint conversion processing to make a virtual viewpoint PC3 on a right rear side of the virtual viewpoint P. The virtual viewpoint PC3 is positioned on a bisector of a line segment connecting the center of the vehicle V with the obstacle Q1 and a line segment connecting the center of the vehicle V with the obstacle Q2. A position of the virtual viewpoint PC3 is represented as (xC3, yC3, zC3).

The following describes the virtual viewpoint PC3. In the present embodiment, the virtual viewpoint PC3 is positioned on the right rear side of the vehicle V. The virtual viewpoint PC3 is positioned on the left rear side of the obstacle Q1 and on the right rear side of the obstacle Q2 when viewed in the Z-axis direction. The virtual viewpoint PC3 is positioned on the right rear side of the virtual viewpoint P when viewed in the Z-axis direction. The virtual viewpoint PC3 is separated from the center of the vehicle V by a distance larger than the distance between the center of the vehicle V and the obstacle Q1 and the distance between the center of the vehicle V and the obstacle Q2. The virtual viewpoint PC3 is a viewpoint of obliquely looking down the vehicle V from the right rear side.

Alternatively, as illustrated in FIG. 13, in a case in which the obstacle Q1 positioned on the right side of the vehicle V and the obstacle Q2 positioned on the left rear side of the vehicle V are detected, the viewpoint conversion processing unit 451 may generate a bird's-eye view image from a virtual viewpoint PC4 positioned on a bisector L30 of an angle between a straight line L27 orthogonal to an extension line L26 from the center of the vehicle V to the obstacle Q1 and a straight line L29 orthogonal to an extension line L28 from the center of the vehicle V to the obstacle Q2. A position of the virtual viewpoint PC4 is represented as (xC4, yC4, zC4).

The following describes the virtual viewpoint PC4. In the present embodiment, the virtual viewpoint PC4 is positioned on the right rear side of the vehicle V. The virtual viewpoint PC4 is positioned on the left rear side of the obstacle Q1 and on a right front side of the obstacle Q2 when viewed in the Z-axis direction. The virtual viewpoint PC4 is positioned on the right rear side of the virtual viewpoint P when viewed in the Z-axis direction. The virtual viewpoint PC4 is separated from the center of the vehicle V by a distance larger than the distance between the center of the vehicle V and the obstacle Q1 and the distance between the center of the vehicle V and the obstacle Q2. The virtual viewpoint PC4 is a viewpoint of obliquely looking down the vehicle V from the right rear side.

In the following description, in a case in which the virtual viewpoint PC1, the virtual viewpoint PC2, the virtual viewpoint PC3, and the virtual viewpoint PC4 are not required to be specifically distinguished from each other, each of them is referred to as a virtual viewpoint PC.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate the bird's-eye view image from the virtual viewpoint PC separated from the virtual viewpoint P that is positioned right above the vehicle V so that the vehicle V and the obstacles Q can be overlooked, and causes the display panel 30 to display the generated bird's-eye view image. The control unit 41 advances the process to Step S18.

As described above, in the present embodiment, in a case in which the obstacles Q in the traveling direction are detected, the bird's-eye view image from the virtual viewpoint PC separated from the virtual viewpoint P that is positioned right above the vehicle V is generated so that the vehicle V and the obstacles Q can be overlooked. According to the present embodiment, in a case in which the obstacles Q in the traveling direction are detected, the position of the virtual viewpoint can be shifted to display the bird's-eye view image in which the obstacles Q do not overlap with each other and a relative positional relation among the obstacles Q and the vehicle V is represented. According to the present embodiment, whether the obstacles Q are brought into contact with the vehicle V can be intuitively recognized from the bird's-eye view image. In this way, according to the present embodiment, the obstacles Q can be appropriately displayed in the bird's-eye view image. According to the present embodiment, visibility of the obstacles Q in the bird's-eye view image can be improved. According to the present embodiment, the obstacles Q around the vehicle can be displayed to be appropriately checked.

According to the present embodiment, for example, the bird's-eye view image from the virtual viewpoint PC can be displayed as if a person guides the vehicle V coming closer to the obstacle Q while standing near a position at which the obstacles Q can be visually recognized and checking both of the obstacles Q and the vehicle V. Due to this, whether the obstacles Q are brought into contact with the vehicle V can be more easily recognized from the bird's-eye view image as compared with the bird's-eye view image 100 from the virtual viewpoint P that is positioned right above the vehicle V.

Fourth Embodiment

Figure 14:
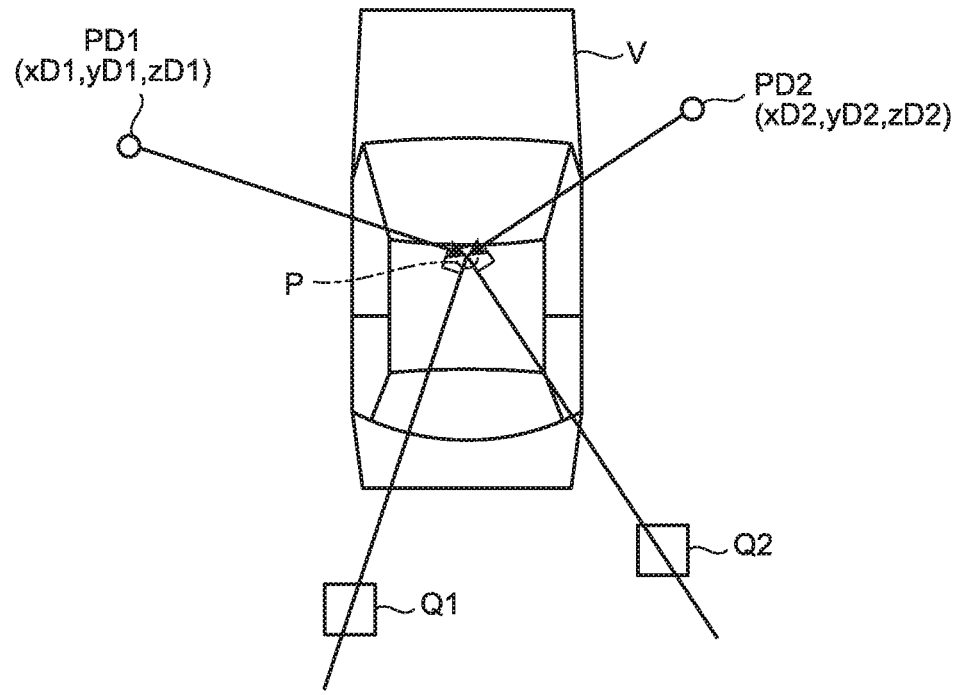
FIG. 14 is a schematic diagram for explaining an example of a position of a virtual viewpoint in a bird's-eye view image generating system according to a fourth embodiment.

The following describes the bird's-eye view image generating system 1 according to the present embodiment with reference to FIG. 14. FIG. 14 is a schematic diagram for explaining an example of the position of the virtual viewpoint in the bird's-eye view image generating system according to a fourth embodiment. In the bird's-eye view image generating system 1 according to the present embodiment, processing performed by the bird's-eye view image generation unit 45 is different from that in the bird's-eye view image generating system 1 according to the first embodiment. In the present embodiment, the obstacle Q1 is positioned on the left rear side of the vehicle V, and the obstacle Q2 is positioned on the right rear side of the vehicle V.

The bird's-eye view image generation unit 45 generates an image obtained by performing viewpoint conversion processing on the periphery images acquired by the image data acquisition unit 42 to make a virtual viewpoint PD1 different from the virtual viewpoint P so that the vehicle V and at least part of the obstacles Q can be overlooked based on the positional information of the obstacles Q acquired by the obstacle information acquisition unit 43. Additionally, the bird's-eye view image generation unit 45 generates an image obtained by performing viewpoint conversion processing on the periphery images to make a virtual viewpoint PD2 different from the virtual viewpoint P so that the vehicle V and at least remaining part of the obstacles Q can be overlooked based on the positional information of the obstacles Q. The bird's-eye view image generation unit 45 then combines two images subjected to the viewpoint conversion processing to generate the bird's-eye view image.

In a case in which the obstacle Q1 and the obstacle Q2 respectively positioned on the left rear side and the right rear side of the vehicle V are detected, the viewpoint conversion processing unit 451 generates an image obtained by performing viewpoint conversion processing to make the virtual viewpoint PD1 on the left side of the virtual viewpoint P, and an image obtained by performing viewpoint conversion processing to make the virtual viewpoint PD2 on the right side of the virtual viewpoint P. A position of the virtual viewpoint PD1 is represented as (xD1, yD1, zD1). A position of the virtual viewpoint PD2 is represented as (xD2, yD2, zD2).

The following describes the virtual viewpoint PD1. In the present embodiment, the virtual viewpoint PD1 is positioned on the left front side of the vehicle V. The virtual viewpoint PD1 is positioned on the left front side of the obstacle Q1 when viewed in the Z-axis direction. The virtual viewpoint PD1 is positioned on the left front side of the virtual viewpoint P when viewed in the Z-axis direction. The virtual viewpoint PD1 is separated from the center of the vehicle V by a distance larger than the distance between the center of the vehicle V and the obstacle Q1. The virtual viewpoint PD1 is a viewpoint of obliquely looking down the vehicle V from the left front side.

The following describes the virtual viewpoint PD2. In the present embodiment, the virtual viewpoint PD2 is positioned on the right front side of the vehicle V. The virtual viewpoint PD2 is positioned on the right front side of the obstacle Q2 when viewed in the Z-axis direction. The virtual viewpoint PD2 is positioned on the right front side of the virtual viewpoint P when viewed in the Z-axis direction. The virtual viewpoint PD2 is separated from the center of the vehicle V by a distance larger than the distance between the center of the vehicle V and the obstacle Q2. The virtual viewpoint PD2 is a viewpoint of obliquely looking down the vehicle V from the right front side.

The combination processing unit 453 combines the image from the virtual viewpoint PD1 that has been subjected to viewpoint conversion processing and the image from the virtual viewpoint PD2 that has been subjected to viewpoint conversion processing to generate the bird's-eye view image. For example, the combination processing unit 453 generates the bird's-eye view image by combining the images so that the image from the virtual viewpoint PD1 that has been subjected to viewpoint conversion processing is displayed on the left side, and the image from the virtual viewpoint PD2 that has been subjected to viewpoint conversion processing is displayed on the right side.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate an image obtained by performing viewpoint conversion processing on the periphery images acquired by the image data acquisition unit 42 to make the virtual viewpoint PD1 different from the virtual viewpoint P so that the vehicle V and at least the obstacle Q1 can be overlooked based on the positional information of the obstacles Q acquired by the obstacle information acquisition unit 43. The control unit 41 causes the bird's-eye view image generation unit 45 to generate an image obtained by performing viewpoint conversion processing on the periphery images to make the virtual viewpoint PD2 different from the virtual viewpoint PD1 so that the vehicle V and at least the obstacle Q2 can be overlooked based on the positional information of the obstacles Q. The control unit 41 then causes the bird's-eye view image generation unit 45 to combine the two images to generate the bird's-eye view image, and causes the display panel 30 to display the generated bird's-eye view image. The control unit 41 advances the process to Step S18.

As described above, in the present embodiment, in a case in which the obstacles Q are detected on the left side and the right side in the traveling direction, the image subjected to viewpoint conversion processing with a plurality of virtual viewpoints is generated. A plurality of images subjected to viewpoint conversion processing are then combined to generate the bird's-eye view image. According to the present embodiment, in a case in which the obstacles Q are detected on the left side and the right side in the traveling direction, the images subjected to viewpoint conversion processing with a plurality of virtual viewpoints can be combined to display the bird's-eye view image representing a relative positional relation among the obstacles Q and the vehicle V.

In a case in which the obstacles Q are detected on the left side and the right side in the traveling direction, when the bird's-eye view image is generated by performing viewpoint conversion processing with any one of the virtual viewpoints on the left side and the right side, the relative positional relation between the vehicle V and the obstacle Q on the opposite side of the virtual viewpoint cannot be represented in some cases.

In contrast, according to the present embodiment, even in a case in which the obstacles Q are detected on the left side and the right side in the traveling direction, for example, the bird's-eye view image obtained by combining the image from the virtual viewpoint PD1 and the image from the virtual viewpoint PD2 can be displayed as if a person guides the vehicle V coming closer to the obstacles Q while standing in the rear of the respective obstacles Q. Whether the obstacles Q are brought into contact with the vehicle V can be easily recognized from the bird's-eye view image. In this way, according to the present embodiment, the obstacles Q can be appropriately displayed in the bird's-eye view image. According to the present embodiment, visibility of the obstacles Q in the bird's-eye view image can be improved. According to the present embodiment, the obstacle Q around the vehicle can be displayed to be appropriately checked.

Fifth Embodiment

Figure 15:
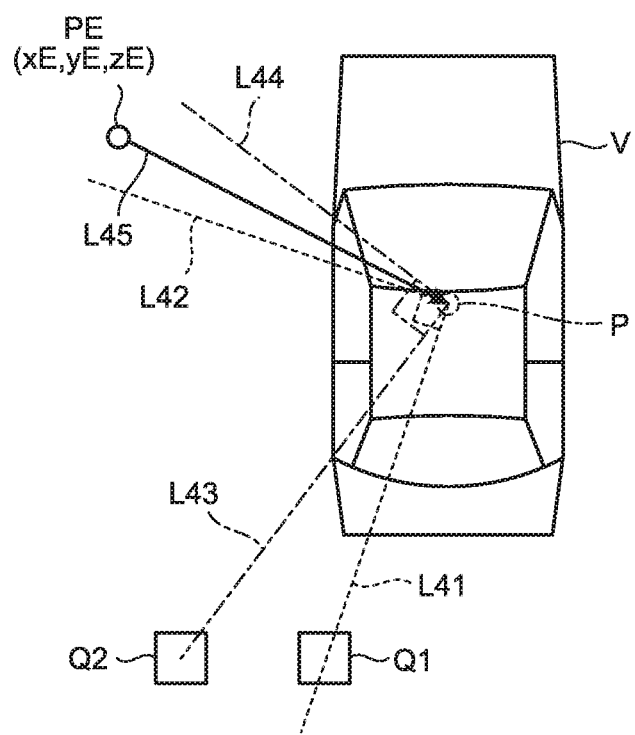
FIG. 15 is a schematic diagram for explaining an example of a position of a virtual viewpoint in a bird's-eye view image generating system according to a fifth embodiment.

The following describes the bird's-eye view image generating system 1 according to the present embodiment with reference to FIG. 15. FIG. 15 is a schematic diagram for explaining an example of the position of the virtual viewpoint in the bird's-eye view image generating system according to a fifth embodiment. In the bird's-eye view image generating system 1 according to the present embodiment, processing performed by the viewpoint conversion processing unit 451 of the bird's-eye view image generation unit 45 is different from that in the bird's-eye view image generating system 1 according to the first embodiment. In the present embodiment, the obstacle Q1 and the obstacle Q2 are positioned side by side in the vehicle width direction on the left rear side of the vehicle V.

In a case in which the obstacle Q1 and the obstacle Q2 positioned on the left rear side of the vehicle V are detected, the viewpoint conversion processing unit 451 may generate a bird's-eye view image from a virtual viewpoint PE that is positioned on a bisector L45 of an angle between a straight line L42 orthogonal to an extension line L41 from the center of the vehicle V to the obstacle Q1 and a straight line L44 orthogonal to an extension line L43 from the center of the vehicle V to the obstacle Q2. A position of the virtual viewpoint PE is represented as (xE, yE, zE).

The following describes the virtual viewpoint PE. In the present embodiment, the virtual viewpoint PE is positioned on the left front side of the vehicle V. The virtual viewpoint PE is positioned on the left front side of the obstacle Q1 and the obstacle Q2 when viewed in the Z-axis direction. The virtual viewpoint PE is positioned on the left front side of the virtual viewpoint P when viewed in the Z-axis direction. The virtual viewpoint PE is separated from the center of the vehicle V by a distance larger than the distance between the center of the vehicle V and the obstacle Q1 and the distance between the center of the vehicle V and the obstacle Q2. The virtual viewpoint PE is a viewpoint of obliquely looking down the vehicle V from the left front side.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate a bird's-eye view image from the virtual viewpoint PE positioned on the bisector L45 of the angle between the straight line L42 orthogonal to the extension line L41 from the center of the vehicle V to the obstacle Q1 and the straight line L44 orthogonal to the extension line L43 from the center of the vehicle V to the obstacle Q2, and causes the display panel 30 to display the generated bird's-eye view image. The control unit 41 advances the process to Step S18.

As described above, in the present embodiment, in a case in which a plurality of obstacles Q are detected in the traveling direction, the bird's-eye view image from a virtual viewpoint separated from the virtual viewpoint P that is positioned right above the vehicle V is generated so that the vehicle V and the obstacles Q can be overlooked. According to the present embodiment, in a case in which the obstacles Q in the traveling direction are detected, the position of the virtual viewpoint can be shifted to display the bird's-eye view image in which the obstacles Q do not overlap with each other and a relative positional relation among the obstacles Q and the vehicle V is represented. According to the present embodiment, whether the obstacles Q are brought into contact with the vehicle V can be easily recognized from the bird's-eye view image. In this way, according to the present embodiment, the obstacles Q can be appropriately displayed in the bird's-eye view image. According to the present embodiment, visibility of the obstacles Q in the bird's-eye view image can be improved. According to the present embodiment, the obstacles Q around the vehicle can be displayed to be appropriately checked.

According to the present embodiment, for example, the bird's-eye view image from the virtual viewpoint PE can be displayed as if a person guides the vehicle V coming closer to the obstacles Q while standing near a position at which the obstacles Q can be visually recognized. Due to this, whether the obstacles Q are brought into contact with the vehicle V can be more easily recognized from the bird's-eye view image as compared with the bird's-eye view image 100 from the virtual viewpoint P that is positioned right above the vehicle V.

Sixth Embodiment

Figure 16:
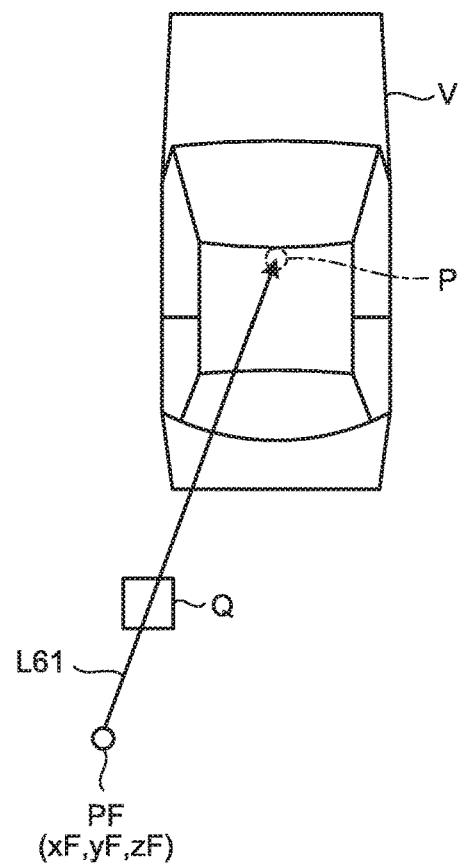
FIG. 16 is a schematic diagram for explaining an example of a position of a virtual viewpoint in a bird's-eye view image generating system according to a sixth embodiment.
Figure 17:
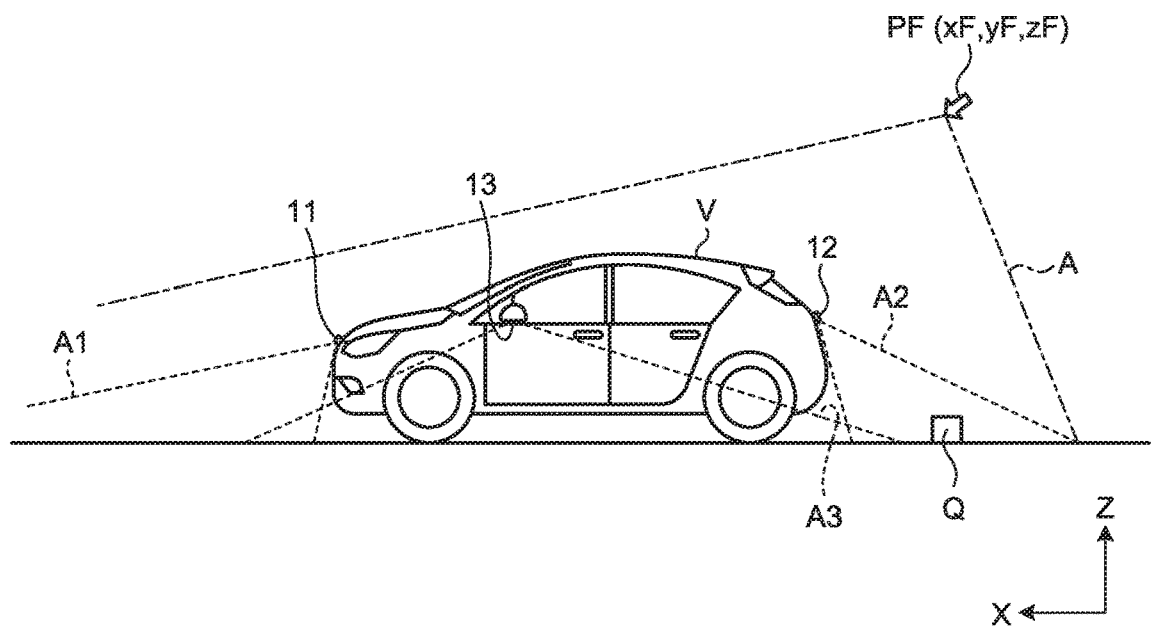
FIG. 17 is a schematic diagram for explaining an example of a position of a virtual viewpoint in the bird's-eye view image generating system according to the sixth embodiment.

The following describes the bird's-eye view image generating system 1 according to the present embodiment with reference to FIG. 16 and FIG. 17. FIG. 16 is a schematic diagram for explaining an example of the position of the virtual viewpoint in the bird's-eye view image generating system according to a sixth embodiment. FIG. 17 is a schematic diagram for explaining an example of the position of the virtual viewpoint in the bird's-eye view image generating system according to the sixth embodiment. In the bird's-eye view image generating system 1 according to the present embodiment, processing performed by the bird's-eye view image generation unit 45 is different from that in the bird's-eye view image generating system 1 according to the first embodiment. In the present embodiment, the obstacle Q1 is positioned on the left rear side of the vehicle V, and the obstacle Q2 is positioned on the right rear side of the vehicle V.

In a case in which there is an obstacle satisfying a predetermined condition, the bird's-eye view image generation unit 45 generates a bird's-eye view image obtained by combining the periphery images acquired by the image data acquisition unit 42 after performing viewpoint conversion processing to make a virtual viewpoint PF at a position defined on an extension line from the vehicle V to the obstacle Q so that the vehicle V and the obstacle Q can be overlooked based on the positional information of the obstacle Q acquired by the obstacle information acquisition unit 43.

In a case in which the obstacle Q positioned on the left rear side of the vehicle V is detected, the viewpoint conversion processing unit 451 generates an image obtained by performing viewpoint conversion processing to make the virtual viewpoint PF positioned on an extension line L61 from the vehicle V to the obstacle Q. A position of the virtual viewpoint PF is represented as (xF, yF, zF).

The following describes the virtual viewpoint PF. In the present embodiment, the virtual viewpoint PF is positioned on the left rear side of the vehicle V. The virtual viewpoint PF is positioned on the left rear side of the obstacle Q when viewed in the Z-axis direction. The virtual viewpoint PF is positioned on the left rear side of the virtual viewpoint P when viewed in the Z-axis direction. The virtual viewpoint PF is separated from the center of the vehicle V by a distance larger than the distance between the center of the vehicle V and the obstacle Q. The virtual viewpoint PF is a viewpoint of obliquely looking down the vehicle V from the left rear side.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate a bird's-eye view image from the virtual viewpoint PF by changing the position of the virtual viewpoint P of the bird's-eye view image 100, and causes the display panel 30 to display the generated bird's-eye view image. The control unit 41 advances the process to Step S18.

In the present embodiment, the control unit 41 causes the bird's-eye view image generation unit 45 to generate an image obtained by performing viewpoint conversion processing to make the virtual viewpoint PF positioned on the extension line L61 from the vehicle V to the obstacle Q, and causes the display panel 30 to display the generated image.

In this way, in a case in which the obstacle Q is detected in the traveling direction, the bird's-eye view image generating system 1 generates the bird's-eye view image obtained by changing the position of the virtual viewpoint to the virtual viewpoint PF that is positioned on the extension line L61 from the vehicle V to the obstacle Q.

As described above, in the present embodiment, in a case in which the obstacle Q is detected in the traveling direction, the bird's-eye view image obtained by changing the position of the virtual viewpoint to the virtual viewpoint PF is generated. Due to this, in the present embodiment, in a case in which the obstacle Q is detected in the traveling direction, the position of the virtual viewpoint can be changed to the position on the extension line L61 from the vehicle V to the obstacle Q to display the bird's-eye view image representing the relative positional relation between the obstacle Q and the vehicle V. According to the present embodiment, whether the obstacle Q is brought into contact with the vehicle V can be intuitively recognized from the bird's-eye view image. In this way, according to the present embodiment, the obstacle Q can be appropriately displayed in the bird's-eye view image. According to the present embodiment, visibility of the obstacle Q in the bird's-eye view image can be improved. According to the present embodiment, the obstacle Q around the vehicle can be displayed to be appropriately checked.

According to the present embodiment, for example, the bird's-eye view image from the virtual viewpoint PF can be displayed as if a person guides the vehicle V coming closer to the obstacle Q while standing in the rear of the obstacle Q. Due to this, whether the obstacle Q is brought into contact with the vehicle V can be more easily recognized from the bird's-eye view image as compared with the bird's-eye view image 100 from the virtual viewpoint P that is positioned right above the vehicle V.

According to the present embodiment, the virtual viewpoint PF is a position at which the angle of view of the generated bird's-eye view image is substantially the same as the angle of view of the bird's-eye view image 100 from the virtual viewpoint P. Due to this, the size of the obstacle Q displayed in the bird's-eye view image from the virtual viewpoint PF is the same as the size of the obstacle Q displayed in the bird's-eye view image 100. According to the present embodiment, the bird's-eye view image can be generated so that a relative distance between the obstacle Q and the vehicle V can be easily recognized even when the position of the virtual viewpoint is changed.

Seventh Embodiment

Figure 18:
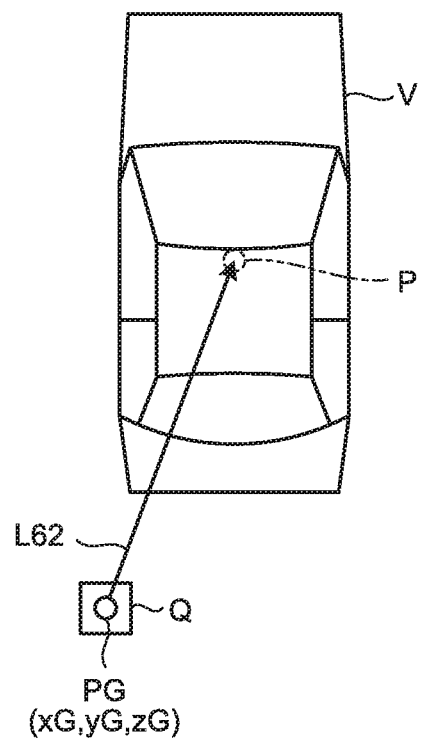
FIG. 18 is a schematic diagram for explaining an example of a position of a virtual viewpoint in a bird's-eye view image generating system according to a seventh embodiment.

The following describes the bird's-eye view image generating system 1 according to the present embodiment with reference to FIG. 18. FIG. 18 is a schematic diagram for explaining an example of the position of the virtual viewpoint in the bird's-eye view image generating system according to a seventh embodiment. In the bird's-eye view image generating system 1 according to the present embodiment, processing performed by the viewpoint conversion processing unit 451 of the bird's-eye view image generation unit 45 is different from that in the bird's-eye view image generating system 1 according to the first embodiment and the sixth embodiment.

In a case in which the obstacle Q acquired by the obstacle information acquisition unit 43 is positioned in the traveling direction of the vehicle V, the viewpoint conversion processing unit 451 generates an image obtained by performing viewpoint conversion processing to make a virtual viewpoint PG that is positioned right above the obstacle Q on an extension line L62 from the vehicle V to the obstacle Q.

In the present embodiment, in a case in which the obstacle Q positioned on the rear side is detected, the viewpoint conversion processing unit 451 generates an image obtained by performing viewpoint conversion processing to make the virtual viewpoint PG that is positioned right above the obstacle Q. A position of the virtual viewpoint PG is represented as (xG, yG, zG).

The following describes the virtual viewpoint PG. In the present embodiment, the virtual viewpoint PG is positioned on the left rear side of the vehicle V. The virtual viewpoint PG is positioned overlapping with the obstacle Q when viewed in the Z-axis direction. The virtual viewpoint PG is positioned on the left rear side of the virtual viewpoint P when viewed in the Z-axis direction. The virtual viewpoint PG is a viewpoint of obliquely looking down the vehicle V from right above the obstacle Q.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate a bird's-eye view image from the virtual viewpoint PG that is positioned on the extension line L62 from the vehicle V to the obstacle Q, and causes the display panel 30 to display the generated bird's-eye view image. The control unit 41 advances the process to Step S18.

As described above, in the present embodiment, in a case in which the obstacle Q in the traveling direction is detected, the bird's-eye view image from the virtual viewpoint PG is generated, the virtual viewpoint PG being positioned right above the obstacle Q on the extension line L62 from the vehicle V to the obstacle Q. According to the present embodiment, in a case in which the obstacle Q in the traveling direction is detected, the position of the virtual viewpoint can be changed to right above the obstacle Q to display the bird's-eye view image in which the relative positional relation between the obstacle Q and the vehicle V is represented more correctly. According to the present embodiment, whether the obstacle Q is brought into contact with the vehicle V can be easily and correctly recognized from the bird's-eye view image. In this way, according to the present embodiment, the obstacle Q can be appropriately displayed in the bird's-eye view image. According to the present embodiment, visibility of the obstacle Q in the bird's-eye view image can be improved. According to the present embodiment, the obstacle Q around the vehicle can be displayed to be appropriately checked.

According to the present embodiment, for example, the bird's-eye view image from the virtual viewpoint PG can be displayed as if a person guides the vehicle V coming closer to the obstacle Q while standing at the same position as the obstacle Q. Due to this, whether the obstacle Q is brought into contact with the vehicle V can be more intuitively recognized from the bird's-eye view image as compared with the bird's-eye view image 100 from the virtual viewpoint P that is positioned right above the vehicle V.

Eighth Embodiment

Figure 19:
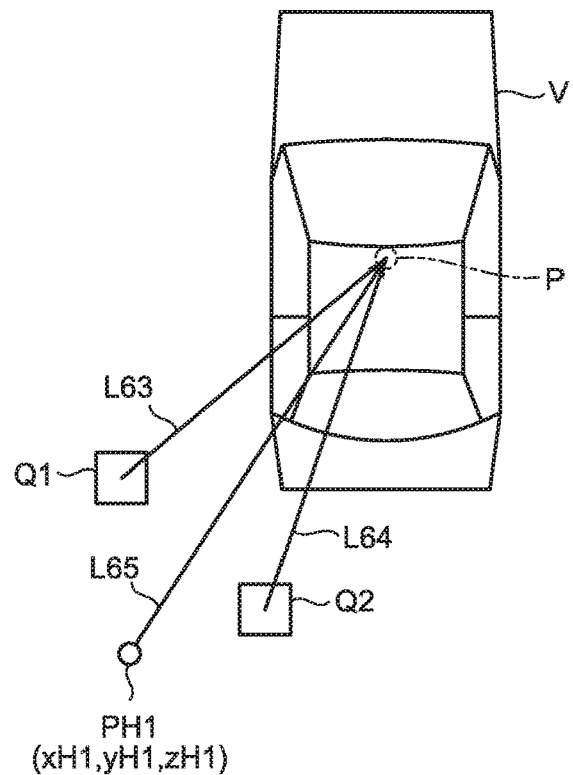
FIG. 19 is a schematic diagram for explaining an example of a position of a virtual viewpoint in a bird's-eye view image generating system according to an eighth embodiment.
Figure 20:
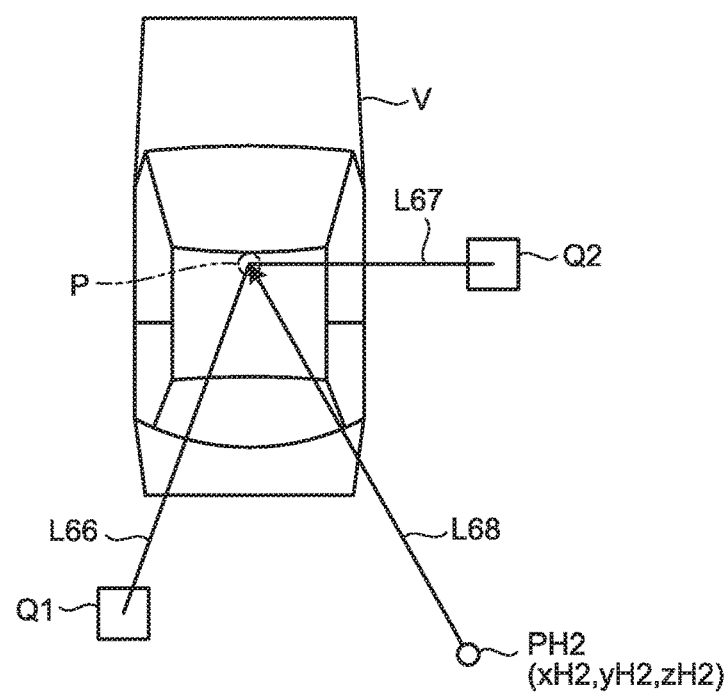
FIG. 20 is a schematic diagram for explaining another example of a position of a virtual viewpoint in the bird's-eye view image generating system according to the eighth embodiment.
Figure 21:
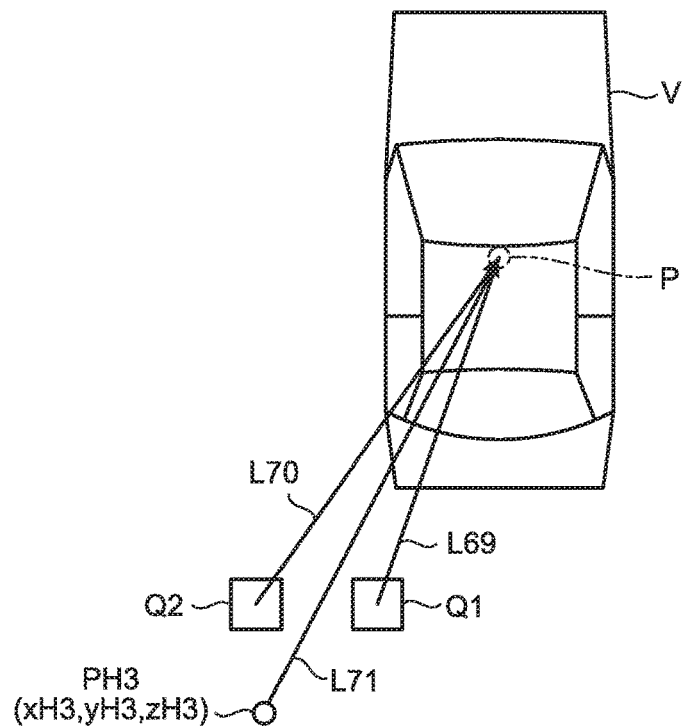
FIG. 21 is a schematic diagram for explaining an example of a position of a virtual viewpoint in the bird's-eye view image generating system according to the eighth embodiment.

The following describes the bird's-eye view image generating system 1 according to the present embodiment with reference to FIG. 19 to FIG. 21. FIG. 19 is a schematic diagram for explaining an example of the position of the virtual viewpoint in the bird's-eye view image generating system according to an eighth embodiment. FIG. 20 is a schematic diagram for explaining another example of the position of the virtual viewpoint in the bird's-eye view image generating system according to the eighth embodiment. FIG. 21 is a schematic diagram for explaining an example of the position of the virtual viewpoint in the bird's-eye view image generating system according to the eighth embodiment. In the bird's-eye view image generating system 1 according to the present embodiment, processing performed by the viewpoint conversion processing unit 451 of the bird's-eye view image generation unit 45 is different from that in the bird's-eye view image generating system 1 according to the first embodiment and the sixth embodiment. In the present embodiment, the obstacle Q1 and the obstacle Q2 are present.

In a case in which there is an obstacle satisfying a predetermined condition, the viewpoint conversion processing unit 451 performs viewpoint conversion processing on the periphery images acquired by the image data acquisition unit 42 to make a virtual viewpoint at a position that is determined based on respective extension lines from the vehicle V to a plurality of obstacles. In the present embodiment, in a case in which there is an obstacle satisfying a predetermined condition, the viewpoint conversion processing unit 451 generates an image obtained by performing viewpoint conversion processing on the periphery images to make a virtual viewpoint PH positioned on a bisector of an angle between any two of the respective extension lines from the vehicle V to the obstacles Q.

The two extension lines may be, for example, extension lines having the largest angle therebetween. Alternatively, the two extension lines may be, for example, extension lines toward two obstacles Q the distances of which from the vehicle V are smaller than others.

In the present embodiment, as illustrated in FIG. 19, in a case in which a plurality of obstacles Q positioned on the left rear side of the vehicle V are detected, the viewpoint conversion processing unit 451 generates an image obtained by performing viewpoint conversion processing to make a virtual viewpoint PH1 positioned on a bisector L65 of an angle between an extension line L63 from the vehicle V to the obstacle Q1 and an extension line L64 from the vehicle V to the obstacle Q2. A position of the virtual viewpoint PH1 is represented as (xH1, yH1, zH1).

The following describes the virtual viewpoint PH1. In the present embodiment, the virtual viewpoint PH1 is positioned on the left rear side of the vehicle V. The virtual viewpoint PH1 is positioned on the rear side of the obstacle Q1 and on the left rear side of the obstacle Q2 when viewed in the Z-axis direction. The virtual viewpoint PH1 is positioned on the left rear side of the virtual viewpoint P when viewed in the Z-axis direction. The virtual viewpoint PH1 is separated from the center of the vehicle V by a distance larger than the distance between the center of the vehicle V and the obstacle Q1 and the distance between the center of the vehicle V and the obstacle Q2. The virtual viewpoint PH1 is a viewpoint of obliquely looking down the vehicle V from the left rear side.

Alternatively, as illustrated in FIG. 20, in a case in which the obstacle Q1 positioned on the left rear side of the vehicle V and the obstacle Q2 positioned on the right side of the vehicle V are detected, the viewpoint conversion processing unit 451 may generate a bird's-eye view image from a virtual viewpoint PH2 positioned on a bisector L68 of an angle between an extension line L66 from the center of the vehicle V to the obstacle Q1 and an extension line L67 from the center of the vehicle V to the obstacle Q2. A position of the virtual viewpoint PH2 is represented as (xH2, yH2, zH2).

The following describes the virtual viewpoint PH2. In the present embodiment, the virtual viewpoint PH2 is positioned on the right rear side of the vehicle V. The virtual viewpoint PH2 is positioned on the right rear side of the obstacle Q1 and on the rear side of the obstacle Q2 when viewed in the Z-axis direction. The virtual viewpoint PH2 is positioned on the right rear side of the virtual viewpoint P when viewed in the Z-axis direction. The virtual viewpoint PH2 is separated from the center of the vehicle V by a distance larger than the distance between the center of the vehicle V and the obstacle Q1 and the distance between the center of the vehicle V and the obstacle Q2. The virtual viewpoint PH2 is a viewpoint of obliquely looking down the vehicle V from the right rear side.

Alternatively, as illustrated in FIG. 21, in a case in which the obstacle Q1 and the obstacle Q2 arranged side by side in the vehicle width direction on the left rear side of the vehicle V are detected, the viewpoint conversion processing unit 451 may generate the bird's-eye view image from a virtual viewpoint PH3 positioned on a bisector L71 of an angle between an extension line L69 from the center of the vehicle V to the obstacle Q1 and an extension line L70 from the center of the vehicle V to the obstacle Q2. A position of the virtual viewpoint PH3 is represented as (xH3, yH3, zH3).

The following describes the virtual viewpoint PH3. In the present embodiment, the virtual viewpoint PH3 is positioned on the left rear side of the vehicle V. The virtual viewpoint PH3 is positioned on the left rear side of the obstacle Q1 and on the right rear side of the obstacle Q2 when viewed in the Z-axis direction. The virtual viewpoint PH3 is positioned on the left rear side of the virtual viewpoint P when viewed in the Z-axis direction. The virtual viewpoint PH3 is separated from the center of the vehicle V by a distance larger than the distance between the center of the vehicle V and the obstacle Q1 and the distance between the center of the vehicle V and the obstacle Q2. The virtual viewpoint PH3 is a viewpoint of obliquely looking down the vehicle V from the left rear side.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate the bird's-eye view image from the virtual viewpoint PH positioned on a bisector of an angle between any two of respective extension lines from the vehicle V to the obstacles Q, and causes the display panel 30 to display the generated bird's-eye view image. The control unit 41 advances the process to Step S18.

As described above, in the present embodiment, in a case in which the obstacles Q in the traveling direction are detected, the bird's-eye view image from the virtual viewpoint PH is generated, the virtual viewpoint PH positioned on the bisector of the angle between any two of the respective extension lines from the vehicle V to the obstacles Q. Due to this, according to the present embodiment, in a case in which the obstacles Q in the traveling direction are detected, the position of the virtual viewpoint can be changed to display the bird's-eye view image in which the obstacles Q do not overlap with each other and a relative positional relation among the obstacles Q and the vehicle V is represented. According to the present embodiment, whether the obstacles Q are brought into contact with the vehicle V can be easily recognized from the bird's-eye view image. In this way, according to the present embodiment, the obstacles Q can be appropriately displayed in the bird's-eye view image. According to the present embodiment, visibility of the obstacles Q in the bird's-eye view image can be improved. According to the present embodiment, the obstacles Q around the vehicle can be displayed to be appropriately checked.

According to the present embodiment, for example, the bird's-eye view image from the virtual viewpoint PH can be displayed as if a person guides the vehicle V coming closer to the obstacles Q while standing between the obstacles Q. Due to this, whether the obstacles Q are brought into contact with the vehicle V can be more easily recognized from the bird's-eye view image as compared with the bird's-eye view image 100 from the virtual viewpoint P that is positioned right above the vehicle V.

Ninth Embodiment

Figure 22:
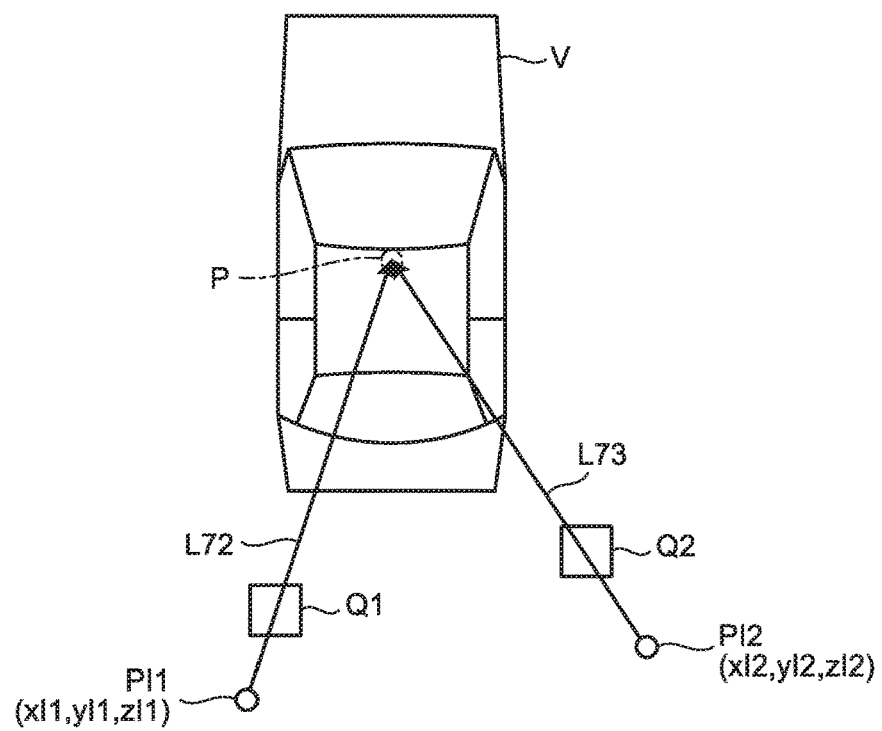
FIG. 22 is a schematic diagram for explaining an example of a position of a virtual viewpoint in a bird's-eye view image generating system according to a ninth embodiment.

The following describes the bird's-eye view image generating system 1 according to the present embodiment with reference to FIG. 22. FIG. 22 is a schematic diagram for explaining an example of the position of the virtual viewpoint in the bird's-eye view image generating system according to a ninth embodiment. In the bird's-eye view image generating system 1 according to the present embodiment, processing performed by the bird's-eye view image generation unit 45 is different from that in the bird's-eye view image generating system 1 according to the first embodiment and the sixth embodiment. In the present embodiment, the obstacle Q1 is positioned on the left rear side of the vehicle V and the obstacle Q2 is positioned on the right rear side of the vehicle V.

The bird's-eye view image generation unit 45 generates an image obtained by performing viewpoint conversion processing on the periphery images acquired by the image data acquisition unit 42 to make a virtual viewpoint PI1 different from the virtual viewpoint P so that the vehicle V and at least part of the obstacles Q can be overlooked based on the positional information of the obstacles Q acquired by the obstacle information acquisition unit 43. Additionally, the bird's-eye view image generation unit 45 generates an image obtained by performing viewpoint conversion processing on the periphery images to make a virtual viewpoint PI2 different from the virtual viewpoint PI1 so that the vehicle V and at least remaining part of the obstacles Q can be overlooked based on the positional information of the obstacles Q. The bird's-eye view image generation unit 45 then generates the bird's-eye view image by combining the two images subjected to the viewpoint conversion processing.

In a case in which the obstacle Q1 positioned on the left rear side of the vehicle V and the obstacle Q2 positioned on the right rear side of the vehicle V are detected, the viewpoint conversion processing unit 451 generates an image obtained by performing viewpoint conversion processing to make the virtual viewpoint PI1 by changing the position of the virtual viewpoint to a position on an extension line L72 from the vehicle V to the obstacle Q1, and an image obtained by performing viewpoint conversion processing to make the virtual viewpoint PI2 by changing the position of the virtual viewpoint to a position on an extension line L73 from the vehicle V to the obstacle Q2. A position of the virtual viewpoint PI1 is represented as (xI1, yI1, zI1). A position of the virtual viewpoint PI2 is represented as (xI2, yI2, zI2).

The following describes the virtual viewpoint PI1. In the present embodiment, the virtual viewpoint PI1 is positioned on the left rear side of the vehicle V. The virtual viewpoint PI1 is positioned on the left rear side of the obstacle Q1 when viewed in the Z-axis direction. The virtual viewpoint PI1 is positioned on the left rear side of the virtual viewpoint P when viewed in the Z-axis direction. The virtual viewpoint PI1 is separated from the center of the vehicle V by a distance larger than the distance between the center of the vehicle V and the obstacle Q1. The virtual viewpoint PI1 is a viewpoint of obliquely looking down the vehicle V from the left rear side.

The following describes the virtual viewpoint PI2. In the present embodiment, the virtual viewpoint PI2 is positioned on the right rear side of the vehicle V. The virtual viewpoint PI2 is positioned on the right rear side of the obstacle Q2 when viewed in the Z-axis direction. The virtual viewpoint PI2 is positioned on the right rear side of the virtual viewpoint P when viewed in the Z-axis direction. The virtual viewpoint PI2 is separated from the center of the vehicle V by a distance larger than the distance between the center of the vehicle V and the obstacle Q2. The virtual viewpoint PI2 is a viewpoint of obliquely looking down the vehicle V from the right rear side.

The combination processing unit 453 combines the image from the virtual viewpoint PI1 that has been subjected to viewpoint conversion processing and the image from the virtual viewpoint PI2 that has been subjected to viewpoint conversion processing to generate the bird's-eye view image. For example, the combination processing unit 453 generates the bird's-eye view image by combining the images so that the image from the virtual viewpoint PI1 that has been subjected to viewpoint conversion processing is displayed on the left side, and the image from the virtual viewpoint PI2 that has been subjected to viewpoint conversion processing is displayed on the right side.

Next, the following describes a processing procedure of the bird's-eye view image generating device 40 in the bird's-eye view image generating system 1. The bird's-eye view image generating device 40 performs processing following the flowchart illustrated in FIG. 8. In the present embodiment, the process at Step S16 is different from that in the first embodiment, and the processes at Step S11 to Step S15, Step S17, and Step S18 are the same as those in the first embodiment.

The control unit 41 changes the position of the virtual viewpoint (Step S16). More specifically, the control unit 41 causes the bird's-eye view image generation unit 45 to generate an image obtained by performing viewpoint conversion processing on the periphery images acquired by the image data acquisition unit 42 to make the virtual viewpoint PI1 different from the virtual viewpoint P so that the vehicle V and at least the obstacle Q1 can be overlooked based on the positional information of the obstacles Q acquired by the obstacle information acquisition unit 43. The control unit 41 causes the bird's-eye view image generation unit 45 to generate an image obtained by performing viewpoint conversion processing on the periphery images to make the virtual viewpoint PI2 different from the virtual viewpoint PI1 so that the vehicle V and at least the obstacle Q2 can be overlooked based on the positional information of the obstacles Q. The control unit 41 then causes the bird's-eye view image generation unit 45 to combine the two images to generate the bird's-eye view image, and causes the display panel 30 to display the generated bird's-eye view image. The control unit 41 advances the process to Step S18.

As described above, in the present embodiment, in a case in which the obstacles Q are detected on the left side and the right side in the traveling direction, the image subjected to viewpoint conversion processing with a plurality of virtual viewpoints is generated. The images subjected to viewpoint conversion processing are combined to generate the bird's-eye view image. According to the present embodiment, in a case in which the obstacles Q are detected on the left side and the right side in the traveling direction, the images subjected to viewpoint conversion processing with a plurality of virtual viewpoints can be combined to display the bird's-eye view image in which a relative positional relation among the obstacles Q and the vehicle V is represented.

In a case in which the obstacles Q are detected on the left side and the right side in the traveling direction, when the bird's-eye view image is generated by performing viewpoint conversion processing with any one of the virtual view points on the left side and the right side, a relative positional relation between the vehicle V and the obstacle Q on the opposite side of the virtual viewpoint cannot be represented in some cases.

In contrast, according to the present embodiment, even in a case in which the obstacles Q are detected on the left side and the right side in the traveling direction, for example, it is possible to display the bird's-eye view image obtained by combining the image from the virtual viewpoint PI1 and the image from the virtual viewpoint PI2 as if a person guides the vehicle V coming closer to the obstacles Q while standing in the rear of the respective obstacles Q. Whether the obstacles Q are brought into contact with the vehicle V can be appropriately recognized from the bird's-eye view image. In this way, according to the present embodiment, the obstacles Q can be appropriately displayed in the bird's-eye view image. According to the present embodiment, visibility of the obstacles Q in the bird's-eye view image can be improved. According to the present embodiment, the obstacle Q around the vehicle can be displayed to be appropriately checked.

The bird's-eye view image generating system 1 according to the present disclosure has been described above, but the bird's-eye view image generating system 1 may be implemented in various different forms other than the embodiments described above.

The components of the bird's-eye view image generating system 1 illustrated in the drawings are merely conceptual, and it is not required that they are physically configured as illustrated necessarily. That is, specific forms of the devices are not limited to those illustrated in the drawings. All or part thereof may be functionally or physically distributed or integrated in arbitrary units depending on a processing load, a usage state, and the like of the devices.

The configuration of the bird's-eye view image generating system 1 is, for example, implemented as software such as a computer program loaded into a memory. In the above embodiments, the configuration is described as functional blocks implemented with such hardware and software cooperating with each other. That is, the functional blocks can be implemented in various forms with only hardware, only software, or a combination thereof.

The components described above include a component that is easily conceivable by those skilled in the art, and substantially the same component. The configurations described above can be appropriately combined. The configurations can be variously omitted, replaced, or modified without departing from the gist of the present disclosure.

In the above description, the predetermined condition is that the obstacle Q is positioned in the traveling direction of the vehicle V, but the embodiment is not limited thereto. The predetermined condition may be, for example, that the obstacle Q may interfere with the vehicle V. For example, "the obstacle Q may interfere with the vehicle V" means that the obstacle Q is positioned in the traveling direction of the vehicle V and has a height from the ground that may be brought into contact with the vehicle V.

In the above description, in a case in which the obstacle Q is positioned in the rear of the front end of the vehicle V when the vehicle V moves backward, it is determined that the predetermined condition is satisfied. However, the embodiment is not limited thereto. For example, in a case in which the obstacle Q is positioned in the rear of the rear end of the vehicle V or in a case in which the obstacle Q is positioned in the rear of an axle position of a driving wheel of the vehicle V when the vehicle V moves backward, it may be determined that the predetermined condition is satisfied.

At Step S11, for example, the control unit 41 may determine whether to start to display the bird's-eye view image depending on whether an operation of starting display of the bird's-eye view image for an operation unit is detected.

The bird's-eye view image obtained by changing the position of the virtual viewpoint may be generated by shifting the center of the host vehicle icon from the center of the bird's-eye view image so that a display area in a direction in which the obstacle Q is detected is increased.

The position of the virtual viewpoint P in the Z-direction may be, for example, at a height of a line of sight of a driver seated on a driver's seat, a height of a line of sight of the driver when he/she stands up, a height of a roof of the vehicle V, and the like.

When the display range of the periphery image displayed on the display unit is switched to be expanded, the obstacle is displayed to be relatively smaller. When the obstacle is displayed to be smaller, it may be difficult to correctly recognize the obstacle. When the obstacle is displayed to be smaller, it may be difficult to correctly grasp a positional relation between the obstacle and the vehicle. In this way, there is room for improvement in displaying a detected obstacle as a bird's-eye view image.

According to the present disclosure, an image can be displayed so that a positional relation between a detected obstacle and a vehicle can be intuitively grasped.

What is claimed is:

1. A bird's-eye view image generating device comprising:
    an image data acquisition unit that acquires periphery image data obtained by photographing a periphery of a vehicle;
    an obstacle information acquisition unit that acquires positional information of an obstacle detected in the periphery of the vehicle;
    a bird's-eye view image generation unit that generates a bird's-eye view image obtained by combining periphery images acquired by the image data acquisition unit, the periphery images having been subjected to viewpoint conversion processing so that a virtual viewpoint is positioned at a position at which the virtual viewpoint is positioned to be separated from a position right above the vehicle in at least one of a vehicle width direction and a front and rear direction and not positioned on an extension line from the vehicle to the obstacle so that the vehicle and the obstacle are able to be overlooked, based on the positional information of the obstacle acquired by the obstacle information acquisition unit; and
    a display control unit that causes a display unit to display the bird's-eye view image generated by the bird's-eye view image generation unit,
    wherein, in a case in which there are a plurality of the obstacles, the bird's-eye view image generation unit generates a bird's-eye view image that has been subjected to viewpoint conversion processing so that the virtual viewpoint is positioned at a position that is determined based on each of respective extension lines from the vehicle to the obstacles and not positioned on the extension line from the vehicle to the obstacle.

2. The bird's-eye view image generating device according to claim 1, wherein the bird's-eye view image generation unit generates a bird's-eye view image that has been subjected to viewpoint conversion processing so that the virtual viewpoint is positioned on an orthogonal line orthogonal to an extension line from the vehicle to the obstacle and not positioned on the extension line from the vehicle to the obstacle.

3. The bird's-eye view image generating device according to claim 1, wherein, in a case in which there are a plurality of the obstacles, the bird's-eye view image generation unit generates a bird's-eye view image that has been subjected to viewpoint conversion processing with a virtual viewpoint that is positioned based on an orthogonal line orthogonal to each of respective extension lines between the vehicle and the obstacles.

4. The bird's-eye view image generating device according to claim 1, wherein, in a case in which there are a plurality of the obstacles, the bird's-eye view image generation unit generates a bird's-eye view image obtained by combining an image that has been subjected to viewpoint conversion processing so that the virtual viewpoint is positioned to be separated from a position right above the vehicle in at least one of the vehicle width direction and the front and rear direction so that the vehicle and at least part of the obstacles are able to be overlooked, and an image that has been subjected to viewpoint conversion processing so that the virtual viewpoint is positioned to be separated from the position right above the vehicle in at least one of the vehicle width direction and the front and rear direction so that the vehicle and at least remaining part of the obstacles are able to be overlooked.

5. The bird's-eye view image generating device according to claim 1, wherein, in a case in which there are a plurality of the obstacles, the bird's-eye view image generation unit generates a bird's-eye view image that has been subjected to viewpoint conversion processing so that the virtual viewpoint is positioned on a bisector of an angle between any two of the respective extension lines from the vehicle to the obstacles.

6. A bird's-eye view image generating system comprising:
   the bird's-eye view image generating device according to claim 1; and
   at least one of a plurality of cameras that photograph the periphery of the vehicle, the display unit, and a detection unit that detects an obstacle and outputs obstacle information.

7. A bird's-eye view image generating method comprising:
   acquiring periphery image data obtained by photographing a periphery of a vehicle;
   acquiring positional information of an obstacle detected in the periphery of the vehicle;
   generating a bird's-eye view image obtained by combining periphery images acquired in the acquiring the periphery image data, the periphery images having been subjected to viewpoint conversion processing so that a virtual viewpoint is positioned at a position at which the virtual viewpoint is positioned to be separated from a position right above the vehicle in at least one of a vehicle width direction and a front and rear direction and not positioned on an extension line from the vehicle to the obstacle so that the vehicle and the obstacle are able to be overlooked, based on the positional information of the obstacle acquired in the acquiring the positional information; and
   causing a display unit to display the bird's-eye view image generated in the generating the bird's-eye view image,
   wherein, in a case in which there are a plurality of the obstacles, the generating the bird's-eye view image generates a bird's-eye view image that has been subjected to viewpoint conversion processing so that the virtual viewpoint is positioned at a position that is determined based on each of respective extension lines from the vehicle to the obstacles and not positioned on the extension line from the vehicle to the obstacle.

8. A non-transitory computer readable recording medium storing therein a computer program configured to cause a computer operating as a bird's-eye view image generating device to execute:
   acquiring periphery image data obtained by photographing a periphery of a vehicle;
   acquiring positional information of an obstacle detected in the periphery of the vehicle;
   generating a bird's-eye view image obtained by combining periphery images acquired in the acquiring the periphery image data, the periphery images having been subjected to viewpoint conversion processing so that a virtual viewpoint is positioned at a position at which the virtual viewpoint is positioned to be separated from a position right above the vehicle in at least one of a vehicle width direction and a front and rear direction and not positioned on an extension line from the vehicle to the obstacle so that the vehicle and the obstacle are able to be overlooked, based on the positional information of the obstacle acquired in the acquiring the positional information at the obstacle information acquisition step; and
   causing a display unit to display the bird's-eye view image generated in the generating the bird's-eye view image,
   wherein, in a case in which there are a plurality of the obstacles, the generating the bird's-eye view image generates a bird's-eye view image that has been subjected to viewpoint conversion processing so that the virtual viewpoint is positioned at a position that is determined based on each of respective extension lines from the vehicle to the obstacles and not positioned on the extension line from the vehicle.

* * * * *